(12) United States Patent
Nishida

(10) Patent No.: US 7,730,479 B2
(45) Date of Patent: Jun. 1, 2010

(54) CELL-PHONE TERMINAL, PROGRAM MANAGEMENT METHOD AND COMPUTER PROGRAM OF SAME

(75) Inventor: Tetsu Nishida, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1378 days.

(21) Appl. No.: 11/091,347

(22) Filed: Mar. 28, 2005

(65) Prior Publication Data

US 2005/0223352 A1 Oct. 6, 2005

(30) Foreign Application Priority Data

| Mar. 30, 2004 | (JP) | ............................. 2004-100267 |
| Mar. 30, 2004 | (JP) | ............................. 2004-100268 |
| Mar. 30, 2004 | (JP) | ............................. 2004-100269 |

(51) Int. Cl.
G06F 9/44 (2006.01)

(52) U.S. Cl. .................. 717/172; 717/121; 717/122; 717/124; 717/126; 717/127; 717/178

(58) Field of Classification Search ........................ None
See application file for complete search history.

(56) References Cited

U.S. PATENT DOCUMENTS

| 2004/0023646 A1* | 2/2004 | Inami et al. .................. 455/418 |
| 2007/0067373 A1* | 3/2007 | Higgins et al. .............. 707/206 |

FOREIGN PATENT DOCUMENTS

| CN | 1480855 A | 3/2004 |
| JP | 06-044084 | 2/1994 |
| JP | 08190491 A | 7/1996 |
| JP | 2001333153 A | 11/2001 |
| JP | 2002175191 A | 6/2002 |
| JP | 2003177926 A | 6/2003 |
| JP | 2003-319020 | 11/2003 |
| WO | 0191424 A1 | 11/2001 |

OTHER PUBLICATIONS

Chinese language office action and its English translation lists the reference above.
Japanese language office action and its English language translation for corresponding Japanese application 2004100269 lists the references above.

* cited by examiner

*Primary Examiner*—Chuck O Kendall
(74) *Attorney, Agent, or Firm*—Hogan & Hartson LLP

(57) ABSTRACT

In a cell-phone terminal for receiving an event and detecting an application corresponding to the event to notify and manage the event, a conflicting condition and a return priority are set to each of multiple applications in advance. On receiving the event making a request for activation of an application later in a status of having an application running in advance, an application management portion suspends the application based on a conflicting condition about the application, and stores return information on the application necessary to activate it again for each return priority in the case of operating the application. When the application is finished, the application management portion reads the return information in lowering order of the return priority and activates a corresponding application by using the return information.

14 Claims, 22 Drawing Sheets

Fig. 4A

| EVENT | APPLICATION |
|---|---|
| 1 | A |
| 2 | B |
| 3 | C |
| 4 | D |
| 5 | E |

70; EVENT APPLICATION TABLE

Fig. 4B

71; APPLICATION STATUS TABLE

| Application queue | Status |
|---|---|
| A | Active (ACT) |
| B | Suspended (SUSPEND) |
| C | Idle (IDLE) |

Fig. 4C

72; APPLICATION INTERNAL STATUS TABLE

| APPLICATION | APPLICATION INTERNAL STATUS |
|---|---|
| A (BROWSER) | DORMANT |
| B (E-mail) | NULL |
| C (ALARM) | WAIT |
| D (TELEPHONE FUNCTION) | CONNECT |

Fig. 5

| | LEVEL 1 | CHILD No | | LEVEL 2 | CHILD No | | LEVEL 3 | CHILD No | | LEVEL 4 (ONLY EVENT EXECUTION) | CHILD No |
|---|---|---|---|---|---|---|---|---|---|---|---|
| 10 | none | 0 | 10 | none | 0 | 10 | none | 0 | 10 | none | 0 |
| 9 | none | 0 | 9 | none | 0 | 9 | none | 0 | 9 | none | 0 |
| 8 | none | 0 | 8 | none | 0 | 8 | none | 0 | 8 | none | 0 |
| 7 | none | 0 | 7 | none | 0 | 7 | none | 0 | 7 | none | 0 |
| 6 | none | 0 | 6 | none | 0 | 6 | none | 0 | 6 | none | 0 |
| 5 | none | 0 | 5 | none | 0 | 5 | none | 0 | 5 | none | 0 |
| 4 | none | 0 | 4 | none | 0 | 4 | none | 0 | 4 | none | 0 |
| 3 | none | 0 | 3 | none | 0 | 3 | none | 0 | 3 | none | 0 |
| 2 | none | 0 | 2 | none | 0 | 2 | ALARM | 0 | 2 | none | 0 |
| 1 | INCOMING (2nd CALL) ACT | f 0 | 1 | INCOMING (1ST CAL) | c 0 | 1 | STANDBY | a | 1 | none | 0 |
| | 80a | | | 80b | | | 80c | | | 80d USED FOR TIMER POSTPONEMENT WAIT, etc. | |

80; RETURN LEVEL TABLE

LOW ← PRIORITY → HIGH

*Fig. 6*

81; CHILD CHAIN TABLE

| | | PARENT No | CHILD No UP | CHILD No DOWN |
|---|---|---|---|---|
| a | DATA FOLDER | 3-1 | 0 | b |
| b | EDITOR | 3-1 | a | 0 |
| c | ICON MENU | 2-1 | 0 | d |
| d | MEMO PAD | 2-1 | c | e |
| e | EDITOR | 2-1 | d | 0 |
| f | ICON MENU | 2-1 | 0 | g |
| g | MEMO PAD | 1-1 | f | l |
| l | EDITOR | 1-1 | g | 0 |

CELL-PHONE TERMINAL, PROGRAM MANAGEMENT METHOD AND COMPUTER PROGRAM OF SAME

BACKGROUND OF THE INVENTION

1. Field of the Invention

The present invention relates to a cell-phone terminal, a program management method and a computer program thereof for controlling a plurality of programs.

The present application claims priority to Japanese Patent Applications No. 2004-100267 filed Mar. 30, 2004, No. 2004-100268 filed Mar. 30, 2004, and No. 2004-100269 filed Mar. 30, 2004, the contents of which are incorporated herein by reference.

2. Description of Related Art

According to a conventional technique, thread histories about processing application programs are stored on a memory of OS (Operating System) in order to have a multi-task-like operation performed on a single-tasking operating system. The operating system monitors whether or not there is the application program requesting an operation next with a timer. In the case where there is an application program which is requesting the operation next, the operating system adds the application program to the thread history and after that, switches control to the application program.

In the case of switching to operate the application program originally used again, it is implemented in a form such as the accumulated thread history is read in order from the one accumulated earliest and the process is switched one by one (for example, patent document 1: Japanese Unexamined Patent Application, First Publication No. H06-44084).

A technique shown in patent document 1 is an example of control on a personal computer having more sufficient processing power and a lower occurrence rate of unexpected interrupt control such as an incoming call than a cell-phone.

According to the conventional technique for the cell-phone, even if an instruction to run a plurality of application programs is specified by use of the timer, it is not possible to start processing a next application program unless each of processes is completed. Furthermore, it is not possible to hold a plurality of previous statuses of the application programs, either. For that reason, in the case of the cell-phone terminal in patent document 2 (Japanese Unexamined Patent Application, First Publication No. 2003-319020) which is the conventional technique, the application programs are individually monitored and controlled according to a type or a status thereof on occurrence of an event such as the incoming call.

As described above, however, the technique in patent document 1 is that on the personal computer having the lower occurrence rate of unexpected interrupts than the cell-phone. It has a problem in that the technique can only read the accumulated thread history in order from the one accumulated earliest. The cell-phone terminal in patent document 2 has a problem in that the control has to be implemented for each individual application because the control is executed according to the type and status of each individual application.

Furthermore, the technique in patent document 1 also has a problem in that, on occurrence of the interrupt, it only switches to a process in a standby status and it does not apply the control in consideration of conflicts of conditions among a running program and a program to be run. The technique in patent document 2 has a problem in that, while it determines the process of an interrupt event based on the type and status of the application program, no consideration is given to a conflict determination process applicable for a plurality of application programs.

The technique in patent document 1 is one in which a personal computer has a lot of memory, where it is easy to add the memory even if application programs are added and the conflicting conditions increase. The cell-phone terminal has a problem in that its memory is limited and it is difficult to increase the memory easily. The technique in patent document 2 has a problem in that the process of the interrupt event is not considered of the amount of memory.

SUMMARY OF THE INVENTION

The present invention has been made in order to solve the problems above, and an object thereof is to provide a cell-phone terminal, a program management unit and a computer program thereof capable of controlling a plurality of application programs in consideration of the interrupt event such as an incoming call. Another object is to provide a cell-phone terminal for facilitating addition of conflicting processes of a plurality of application programs and sharing the conflicting processes for each individual application program. A further object is to provide a cell-phone terminal for controlling a plurality of programs with a limited amount of memory.

To solve the above-mentioned problems, the present invention provides a cell-phone terminal which manages an operation of a plurality of programs by receiving an event information, detecting a program for an application corresponding to the event information out of the plurality of programs and notifying the detected program of reception of the event, involving: a return information storing means for storing return information which is necessary to resume a program which was being executed in advance; and a program returning means for activating programs, wherein a conflicting condition and a return priority being preset to each of the plurality of programs in advance; the return information storing means storing the return information of an executing program according to the return priority, under a condition of receiving the event information requesting for activating another program in a situation of having the executing program in advance, referring to the conflicting condition of the another program which is requested for execution, and activating the another program after suspending the executing program due to the conflicting condition of the another program; and the program returning means, each time the executing program is finished, reading the return information stored by the return information storing means in decreasing order of the return priority and activating a program corresponding to the read return information.

Also the present invention provides the cell-phone terminal, wherein the return information storing means stores the return information which is necessary to resume another program, as to each of the return priorities, under conditions of executing a program in advance, receiving the event information which requests to execute the another program, and not activating the another program which is requested to execute, but executing the program continuously, referring to the conflicting condition of the another program.

Also the present invention provides the cell-phone terminal, wherein the program returning means, on reading the return information in decreasing order of the return priority which is stored by the return information storing means, reads the return information most newly recorded in a case in which the return priority is duplicated after end of execution of a program.

Also the present invention provides the cell-phone terminal, wherein setting of the return priority is changeable by a user's operation.

Also the present invention provides the cell-phone terminal, wherein the return priority does not allow a program to resume when a predetermined value is set.

To solve the above-mentioned problems, the present invention provides a program management unit which manages an operation of a plurality of programs by receiving an event information, detecting an program for application corresponding to the event information out of the plurality of programs and notifying the detected program of reception of the event, involving steps of: first step of receiving the event information which requests for activation of another program while a program is executing in advance; second step of storing a return information which is necessary to resume the program executing in advance, as to each return priority being predetermined to each of the plurality of programs in advance, in case of referring to a conflicting condition of the another program which is requested to execute and executing that program by suspending the program based on the conflicting condition; and third step of reading the return information which is stored in the second step, in decreasing order of the return priority, and activating a corresponding program corresponding to the read return information, each time the executing program is finished.

To solve the above-mentioned problems, the present invention provides a computer program product in a computer readable medium for use in a cell-phone terminal which manages an operation of a plurality of programs by receiving an event information, detecting another program for application corresponding to the event information out of the plurality of programs and notifying the another program of reception of the event, the computer program product involving: first instructions for applying a return information storing unit to store a return information which is necessary to resume a program that is executing in advance, as to each return priority predetermined to each of the plurality of programs, under a condition of receiving the event information which requests for activation of the another program in a situation of having the executing program in advance, referring to the conflicting condition of the another program and activating the another program after suspending the executing program based on the conflicting condition; and second instructions for applying a program returning unit, each time the executing program is finished, to read the return information stored by the return information storing unit in decreasing order of the return priority and activating a program corresponding to the read return information.

To solve the above-mentioned problems, the present invention provides a cell-phone terminal having a plurality of programs of applications and resources of devices used by the applications, involving: a program management unit for detecting a program corresponding to an event information which is received, out of the plurality of programs in the case of receiving the event information, checking a status of programs other than the detected program and resources and responding with a check result in case of receiving a status check request, and not activating the detected program in case of receiving a notice not to activate the detected program, and storing a return information for resuming the detected program in a predetermined storage area and reading the return information and activating the detected program when an executing program finishes; a conflicting condition storing portion for storing conflicting conditions in which conditions are set for not allowing activation according to the status of other programs or the resources as to each of the plurality of programs; and a event judgment unit for, if the program management unit receives the event information, reading the conflicting condition corresponding to the program detected by the program management unit from the conflicting condition storing portion and sending the status check request to the program management unit, making a reference, on receiving the check result from the program management unit, as to whether the check result matches with the status established in the read conflicting condition so as to activate the program detected by the program management unit in the case of matching with none of the conflicting conditions and notify the program management unit that the program is not to be activated in the case of matching with one of the conflicting conditions.

Also the present invention provides the cell-phone terminal, wherein the event judgment unit, on activating the program detected by the program management unit, sends a notice of activation to the program management unit which, on receiving the notice, checks an operational status of the programs other than the program to be activated and suspends an executing program if there is one so as to store the return information in the predetermined storage area for resuming the executing program later.

Also the present invention provides the cell-phone terminal wherein a program is associated with a preset and predetermined conflicting condition in the case where the program is created by a third party and received via network.

Also the present invention provides the cell-phone terminal, wherein the conflicting condition storing portion stores special conflicting conditions in common among a plurality of pieces of the event information, and after receiving the event information, the event judgment unit reads the special conflicting conditions and determines whether or not the check result matches with the special conflicting conditions before determining whether or not the check result matches with the conflicting conditions so as to determine whether or not the check result matches with the conflicting conditions in the case of not matching with the special conflicting conditions.

To solve the above-mentioned problems, the present invention provides a program management unit of a cell-phone terminal which has a program management portion for storing a plurality of programs of applications and having resources of devices used by the applications and managing operations of the programs, an event judgment portion for determining a conflicting status of the programs, and a conflicting condition storing portion for storing conflicting conditions in which conditions are set for not allowing execution of each of programs according to status of other programs and the resources in advance, involving steps of: detecting the program corresponding to a received event information out of the plurality of programs by the program management portion in case of receiving the event information; reading the conflicting condition corresponding to the program detected by the program management portion from the conflicting condition storing portion and sending a status check request to the program management portion, by the event judgment portion, when the program management portion receives the event information; checking status of the programs other than the detected program and the resources and responding with a check result in case of receiving the status check request, by the program management portion; making a reference as to whether the check result matches with the status established in the read conflicting condition when the check result from the program management portion is received, activating the program detected by the program management portion in case of matching with none of the conflicting conditions, and notifying the program management unit that the program is not to be activated in the case of matching with one of the conflicting conditions, by the event judgment portion; and storing a return information for resuming the detected program in a predetermined storage area without activating the detected program, and reading the return information and activating the detected program on finishing a program which is executing, by the program management portion when notified that the detected program is not to be activated.

To solve the above-mentioned problems, the present invention provides a computer program product for a computer of a cell-phone terminal having a program management portion for storing a plurality of programs of applications and having resources of devices used by the applications and managing operation of the programs, an event judgment portion for determining a conflicting status of the programs, and a conflicting condition storing portion for storing conflicting conditions in which conditions are set for not allowing activation of each of the programs according to the status of the other programs and the resources in advance, the computer program product involving: program code for performing so as to make the program management portion detect the program corresponding to the received event information out of the plurality of programs in the case where the program management portion receives event information; program code for performing so as to make the event judgment portion read the conflicting conditions corresponding to the program detected by the program management portion from the conflicting condition storing portion and send the status check request to the program management portion in which the program management portion receives the event information; program code for performing so as to make the program management portion check a status of the programs other than the detected program and the resources and responding with a check result in case of receiving the status check request; program code for performing so as to make the event judgment portion on receiving the check result from the program management portion, make a reference as to whether the check result matches with the status established in the read conflicting condition so as to activate the program detected by the program management portion in the case of matching with none of the conflicting conditions and notify the program management portion that the program is not to be activated in the case of matching with one of the conflicting conditions; and program code for performing so as to make the program management portion, if notified that the detected program is not to be activated, store return information for resuming the detected program in a predetermined storage area without activating the detected program, and read the return information and activate the detected program on finishing the executing program.

To solve the above-mentioned problems, the present invention provides a cell-phone terminal for receiving event information, detecting a program of an application corresponding to the event information out of a plurality of programs and notifying the program of the event information so as to manage an operation of the program, involving: an operational status storing portion for storing operational statuses of the plurality of programs; a conflicting condition determining unit for determining whether or not to activate the program based on a preset and predetermined conflicting condition and the event information on detecting the program corresponding to the event information; and a program management unit for, on receiving a determination to newly activate the program from the conflicting condition determining unit, reading the operational statuses of the programs other than the program from the operational status storing portion, suspending an executing program and activating the program determined to be newly activated so as to update the operational status of the operational status storing portion.

Also the present invention provides the cell-phone terminal, wherein the program management unit stores return information for resuming the program in a predetermined storage area on suspending the executing program and activating the program on finishing the executing program based on the return information.

To solve the above-mentioned problems, the present invention provides a program management unit for receiving event information, detecting a program of an application corresponding to the event information out of a plurality of programs, notifying the program of the event information and storing an operational status of the program so as to manage an operation of the program, involving steps of: determining whether or not to activate the program based on a preset and predetermined conflicting condition and the event information on receiving the event information and detecting the program corresponding to the event information; and when it is determined to newly activate the program, reading the operational statuses of programs other than the program from stored operational statuses, suspending an executing program and activate the program determined to be newly activated so as to update the stored operational status.

To solve the above-mentioned problems, the present invention provides a computer program product in a computer readable medium for use in a cell-phone terminal for receiving event information, detecting a program of an application corresponding to the event information out of a plurality of programs, notifying the program of the event information and storing an operational status of the program so as to manage an operation of the program, the computer program product involving: first instructions for determining whether or not to activate the program based on a preset and predetermined conflicting condition and the event information on receiving the event information and detecting the program corresponding to the event information; and second instructions for, when determined to newly activate the program, reading the operational statuses of the programs other than the program from stored operational statuses, suspending the executing program and activate the program determined to be newly activated so as to update the stored operational status.

According to the present invention, the return information for resuming the program of which activation is avoided or the program suspended due to conflict is stored by a return information storing portion based on the return priorities predetermined for the program. On finishing the running program, the program is resumed in decreasing order of the return priority and based on the return information most newly stored. For that reason, arbitrary resuming control over the application programs on the cell-phone terminal is possible. It is thereby possible, even if the program is suspended due to interrupt processing such as an incoming call, incoming e-mail and an alarm, to execute such control as resuming the alarm first and then processing the incoming e-mail.

According to the present invention, a user can change the return priorities on the cell-phone terminal. For that reason, the user can individually change the resuming order to suit his or her preferences.

According to the present invention, the application program is not to be returned by setting a predetermined value such as zero as the return priority. For that reason, it is possible, if an auto-power-off program is suspended during the incoming of a call, to prevent to resume the auto-power-off after the incoming of a call.

According to the present invention, the conflicting condition prescribing whether or not to activate each individual program is determined in advance. On receiving the event information requesting the activation of the program, the conflicting condition corresponding to the program is read to check whether the cell-phone terminal is in the status of matching with the conflicting condition. The program is activated in the case of matching with none of the conflicting conditions, and is not activated in the case of matching with one of the conflicting conditions. For that reason, in the case of adding the application program, it is possible to update the conflicting conditions just by adding the conflicting condition corresponding to the added application program. It is thereby possible to reduce workloads in program design, such as a degree of influence over the other programs to be considered in the case of integrally managing the conflicting conditions.

According to the present invention, as to the programs created by a third party such as games downloaded via the network, the conflicting conditions thereof cannot be known and so a predetermined conflicting condition in advance such as a highly exclusive one, for instance, is applied. It is thereby possible to reduce the influence over existing programs so as to avoid a status such as a freeze of the programs.

According to the present invention, on activating a new program according to the event information, the running program is suspended by referring to the statuses of the other programs. For that reason, it is possible to manage the cell-phone terminal to constantly have only one program running thereon. Thus, it is no longer necessary to use a function of an operating system of simultaneously running and switching a plurality of programs. Therefore, it is possible to sparingly use the memory on the side of the application of which program is used.

According to the present invention, on finishing the running program, the return information for resuming the program is stored. For that reason, it is possible to resume the program after finishing the other program running. It is thereby possible to conserve memory while realizing the same functions which have been already provided to the operating system such as switching among the plurality of programs.

BRIEF DESCRIPTION OF THE DRAWINGS

FIGS. 4A-4C are block diagrams showing tables on which an application management portion stores information for event control according to the same embodiment;

FIG. 5 is a diagram showing a return level table according to the same embodiment;

FIG. 6 is a diagram showing a child chain table according to the same embodiment;

DETAILED DESCRIPTION OF THE INVENTION

Figure 1:
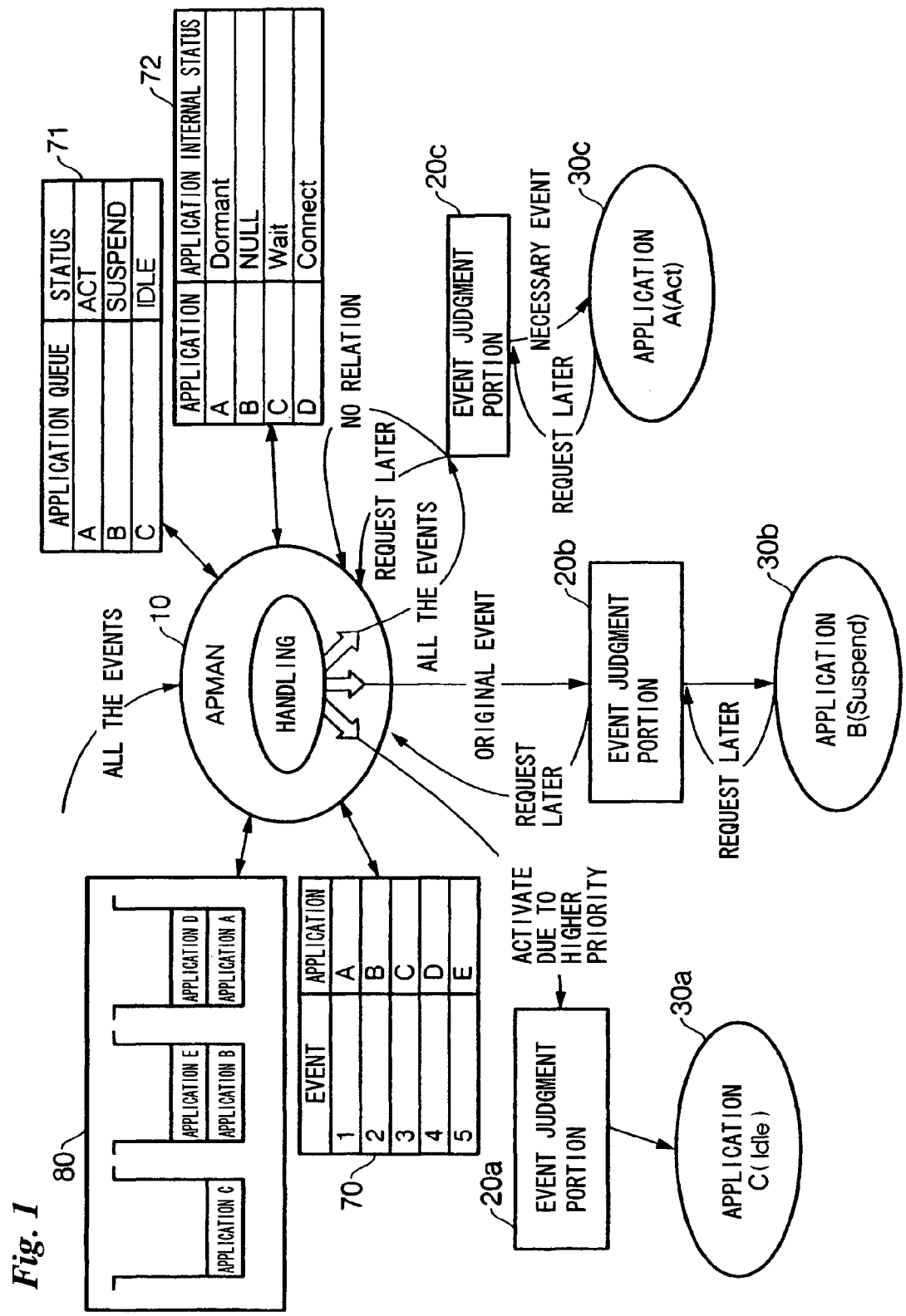
FIG. 1 is a block diagram showing a configuration of a portion involved in application program management in a cell-phone terminal according to an embodiment of the present invention.

Hereunder, a cell-phone terminal according to an embodiment of the present invention will be described by referring to the drawings.

FIG. 1 is a schematic block diagram showing a configuration of a portion involved in application program management in the cell-phone terminal according to an embodiment of the present invention.

An event application table 70 is a table storing associations as to which application programs should be notified of events notified from an operating system (hereafter, referred to as "OS") and other application programs.

An application status table 71 stores a status of each application program. An application internal status 72 stores an operational status of the active application program.

A return level table 80 is a stack-type storage portion for storing return information required on resuming the application programs which are suspended (=Suspend) while running and the application programs which are idled (=Idle) on a run due to conflict determination described later.

Applications 30a, 30b and 30c are the application programs for operating inside the cell-phone terminal, and they include programs of a standby application, mail and a camera.

Event judgment portions 20a, 20b and 20c are provided to the applications 30a, 30b and 30c respectively, and determine a competitive status as to whether or not activation is possible in terms of a relationship with a running application program on receiving an event for activating the application program. To determine the competitive status, they inquire about the statuses and internal statuses of other applications. They store conflicting conditions unique to the application programs under their management in advance, and determine operations of the application programs based on the statuses of other applications and stored unique conflicting conditions.

In FIG. 1, an application management portion (APMAN in FIG. 1) 10 receives all the events occurring on the cell-phone terminal, and notifies the currently active application or the application programs associated with the event application table 70 of the received events.

The application management portion 10 also receives a request for an activation of the application program and other events from the OS, and sends the events from the event application table 70 to the event judgment portion of a corresponding application program. Upon an inquiry from the event judgment portion, the application management portion 10 responds as to status information on other applications. According to a result in the event judgment portion, it starts the application program requested to activate and suspends the currently active application.

According to determination results of the event judgment portion, the application management portion 10 stores on the return level table the return information on the application which is idled for a future execution and the application suspended while currently in operation. On normal termination of the active application, the application management portion 10 reads the return information on the application of the highest priority out of those stored on the return level table so as to resume it.

Figure 2A:
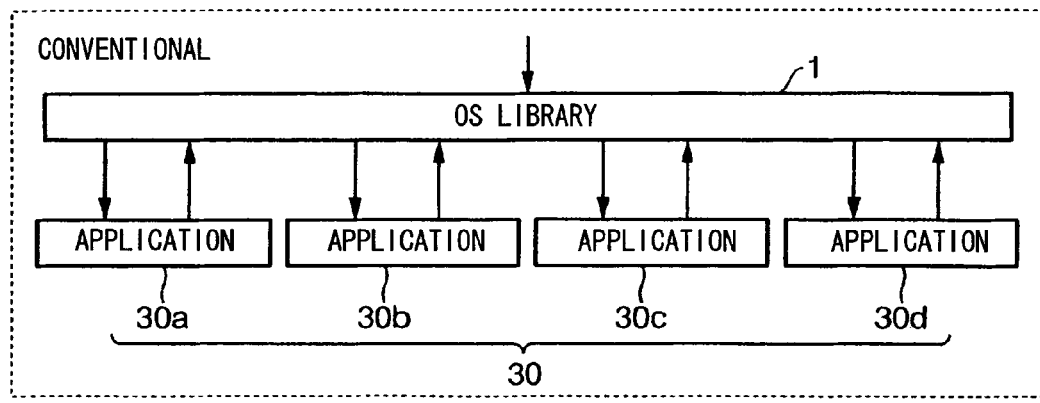
FIGS. 2A and 2B are diagrams showing a difference in the configuration of a functional block involved in the application program management between a conventional technique and the same embodiment.
Figure 2B:
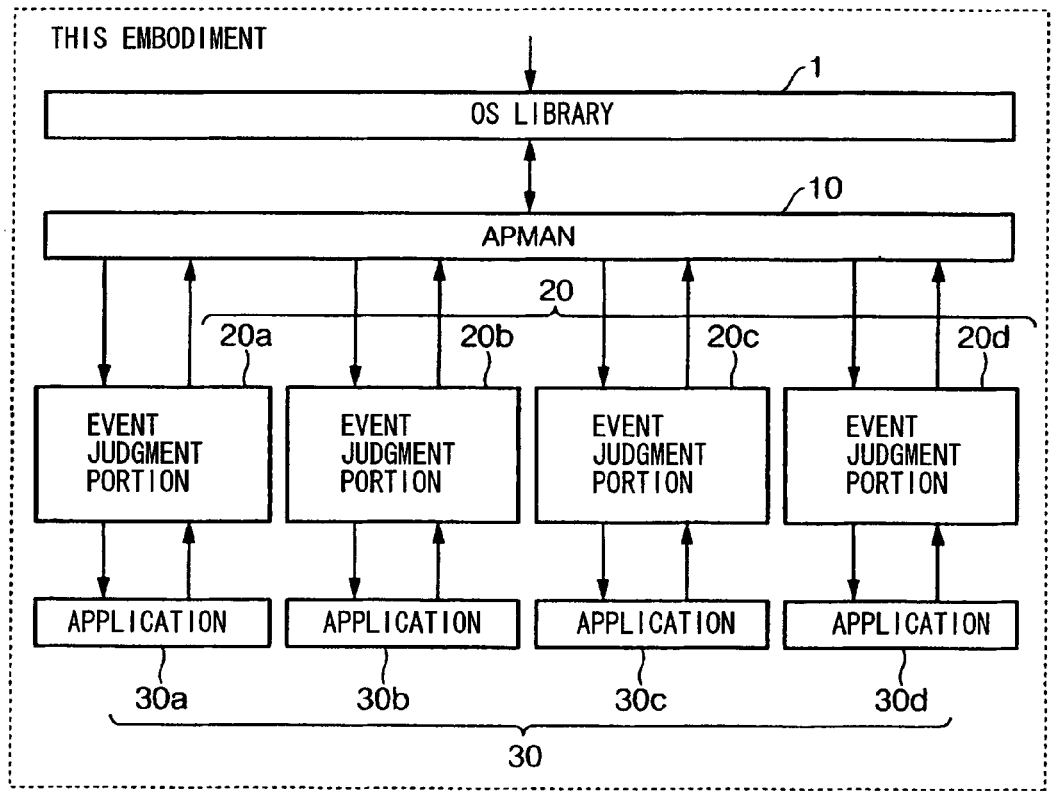

FIGS. 2A and 2B are diagrams showing a difference in the configuration of a functional block involved in application management between a conventional technique and this embodiment. In FIGS. 2A and 2B, an OS library 1 is a part of the operating system for actually executing the application programs on the cell-phone terminal, and in the case where a user operates the cell-phone terminal, it generates the event based on that operation.

FIG. 2A is a diagram showing a conventional configuration, where the OS library 1 of the cell-phone terminal receives a signal generated by a user's operation, and sorts the event to the applications 30. As the OS library 1 also performs conflict management of the applications, it needs to newly create a conflict process each time the application is added. Therefore, a large table is required for the conflict process and the configuration is very complicated.

FIG. 2A is a diagram showing the configuration of this embodiment, where the OS library 1 does not directly notify the applications 30 of the event but first notifies the application management portion 10 of all of it. Each of applications 30 has the event judgment portion 20 storing the conflicting condition of each application 30 individually provided thereto. When sorting the received events to the applications 30, the application management portion 10 first notifies the corresponding event judgment portion 20 thereof.

The event judgment portion 20 determines whether or not it can be activated by checking it against the conflicting conditions of the application programs stored in advance under its own management. In that case, the event judgment portion 20 requests and obtains from the application management portion 10 a resource status of the cell-phone terminal for using a camera thereof and other application statuses. If determined that it can be activated, the event judgment portion 20 starts the corresponding application 30. In the case where it cannot be activated, the return information is stored on the return level table 80 for the sake of idling it.

In FIG. 2B, the application management portion 10 exerts control so that there is constantly one application 30 in operation on the cell-phone terminal. For that reason, if a new application 30 starts, the application management portion 10 also exerts control to suspend the running application 30 and finish the application program to remove it from a memory so as to store the return information on the above-mentioned return level table 80.

Conventionally, the OS library 1 performs a sorting process of the events and the processes of activating, finishing, suspending, idling and resuming the applications 30 and the process of conflict determination. In this embodiment, the application management portion 10 performs the sorting process of the events and the processes of activating, finishing, suspending, idling and resuming the applications 30, and each event judgment portion 20 performs the process of conflict determination by closing it off on the corresponding application 30.

For that reason, the process of conflict determination does not center on one portion but is dispersed. Even if the application 30 is added, it is possible to newly add the event judgment portion 20 so as to add the process of conflict determination. For instance, even when performance of a camera device is improved, it is sufficient to change the application program related to control of the camera device without changing the process of conflict determination so that no significant change is made to the OS and the application management portion 10.

The application management portion 10 exerts control to run only one application 30 on the cell-phone terminal. For that reason, there is only one application program running on the OS, and so it is no longer necessary to use a stack storage area of the OS library 1 incapable of a complicated resuming process such as priority processing.

It is thereby possible to control the conflict determination of the application program only with the application management portion 10. It is also possible, when adding a function, to do so by closing it off on the application side without the need to change the OS. Furthermore, as there is constantly only one application running, it can be simple with few constraints on the process of conflict determination, which facilitates the process and leads to an advantage in design.

Figure 3:
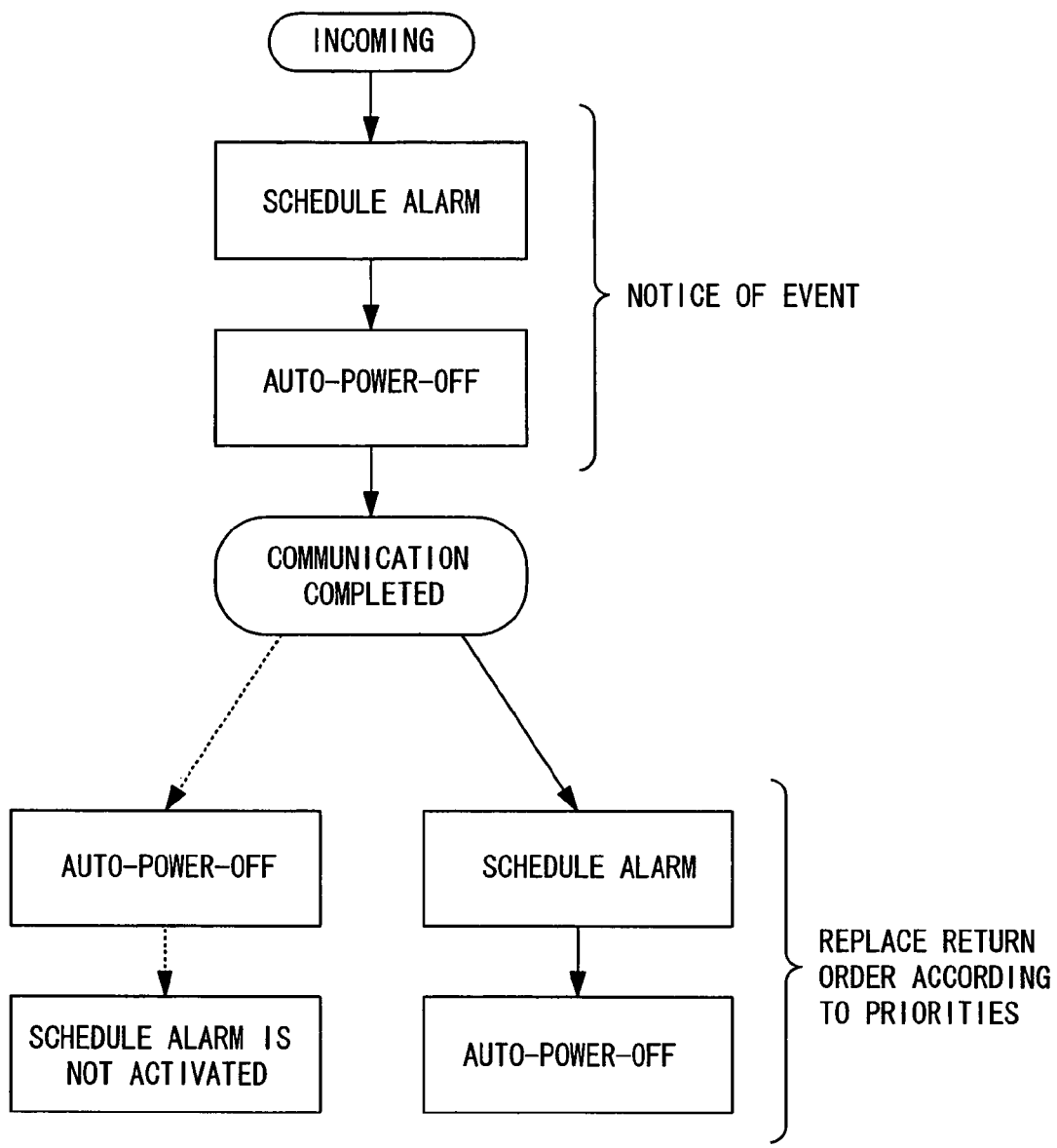
FIG. 3 is a diagram showing a concrete example of priority processing on returning an application program according to the same embodiment.

FIG. 3 is a diagram showing a concrete example of the priority processing on resuming the application program achieved by using the above-mentioned return level table 80.

In FIG. 3, the application programs on the cell-phone terminal are exemplified by a schedule alarm for sounding an alarm at a preset time and date and an auto-power-off for automatically turning off the power when the time comes.

Here, the case where a notice of an event of the schedule alarm is given during the incoming of a call and then a notice of an event of the auto-power-off is given is assumed. Conventionally, it is only possible to resume an endmost event on a stack first, and so the auto-power-off resumes and the power of the cell-phone terminal is put in an off state without sounding the schedule alarm. As such a specification is inconvenient for the user, this embodiment allows the order to be interchanged by using the return level table 80 so as to sound the schedule alarm first and then turn off the power with the auto-power-off.

FIGS. 4A-4C are diagrams showing tables on which the application management portion 10 stores the information for controlling the events.

The event application table 70 of FIG. 4A is a table to be referred to by the application management portion 10 when sorting the events received from the OS library 1, and stores the events and reference information on the application programs correspondingly.

The application status table 71 of FIG. 4B is a table for storing current statuses of the applications, where the statuses are active, suspended and idled.

The application internal status table 72 of FIG. 4C is a table for storing internal statuses of the applications, where the statuses unique to the applications such as dormant, null, waiting and connecting are stored.

FIG. 5 are diagrams showing the return level tables 80 for storing the information required on resuming the application program suspended or idled while running by the application management portion 10 due to the result of the conflict determination of the event judgment portion 20. The return level tables 80 are stack-type storage areas for resuming the information in order from the one stored earliest.

As shown in FIG. 5, stacks are provided by several return levels as in return level tables 80a, 80b, 80c and 80d. Each of the application programs is stored on the stack of applicable level according to the return level preset in the application program. Upon the normal termination of the currently active application, the application management portion 10 refers to the return level table and resumes the application program of the highest priority stored earliest.

The above-mentioned OS library 1 also has the stack-type storage area for suspending and idling the applications. As the OS library 1 has only one stack-type storage area; however, it is only possible to resume the earliest one out of the application programs stored on the stack. According to this embodiment, the application programs are stored according to the return levels preset in the application programs, and so it is possible to resume the application programs in the order in which they should be resumed in conformance with the specification of the cell-phone terminal. As the return levels of the application programs are arbitrarily changeable, they can be freely set by individual users on the cell-phone terminal.

For instance, in the case where return priorities are specifiable by the users, there should be an indication that an individual return level number should be assigned to each of competing applications on a display portion (not shown) of the cell-phone terminal by using a graphic user interface. For instance, the events possibly leading to conflict should be listed, such as the camera, reception of e-mail, mail creation, auto-power-off, schedule alarm and wake-up alarm. Individual serial numbers from 1 should be assigned next to these events with a numeric keypad (not shown).

Here, the return level tables equivalent to the serial numbers are provided. When each of the applications is idled, a worker (hereinafter, worker is a minimum unit constituting the applet as a subject of the conflict determination and resume control) at that point in time its stacked.

It is admissible even if the number of the applications does not match with a sum of the serial numbers and some numbers are overlapping.

In the case of overlapping, however, a different application may be stacked on the return level table of the overlapping number so that on resuming, new ones will be resumed first.

Here, "0" may be specified as the number specified as the return level. In this case, an idling instruction may be normally given rather than providing a return level table "0" so as to be stacked on the return level table according to the return level. However, it is not stacked on the return level table but is handled as termination because it is "0." To be more specific, a specified application of the return level "0" is to be activated, but conflict determination with another application already running will be performed.

As a result of the determination, it is determined to be unable to run and be idled. However, this worker is not stacked on the return level table but is handled as the termination. In the case where the user is already running some application, the return level "0" should be specified in advance when the wake-up alarm should not sound. It is thereby possible to address such detailed needs.

A child chain table 81 of FIG. 6 stores parent-child relations in order to resume the application programs in consideration of their parent-child relations on resuming. When detecting the application program to be resumed by referring to the return level tables 80, the application management portion 10 refers to the child chain table 81 for detecting the application program in a child relationship.

Figure 7:
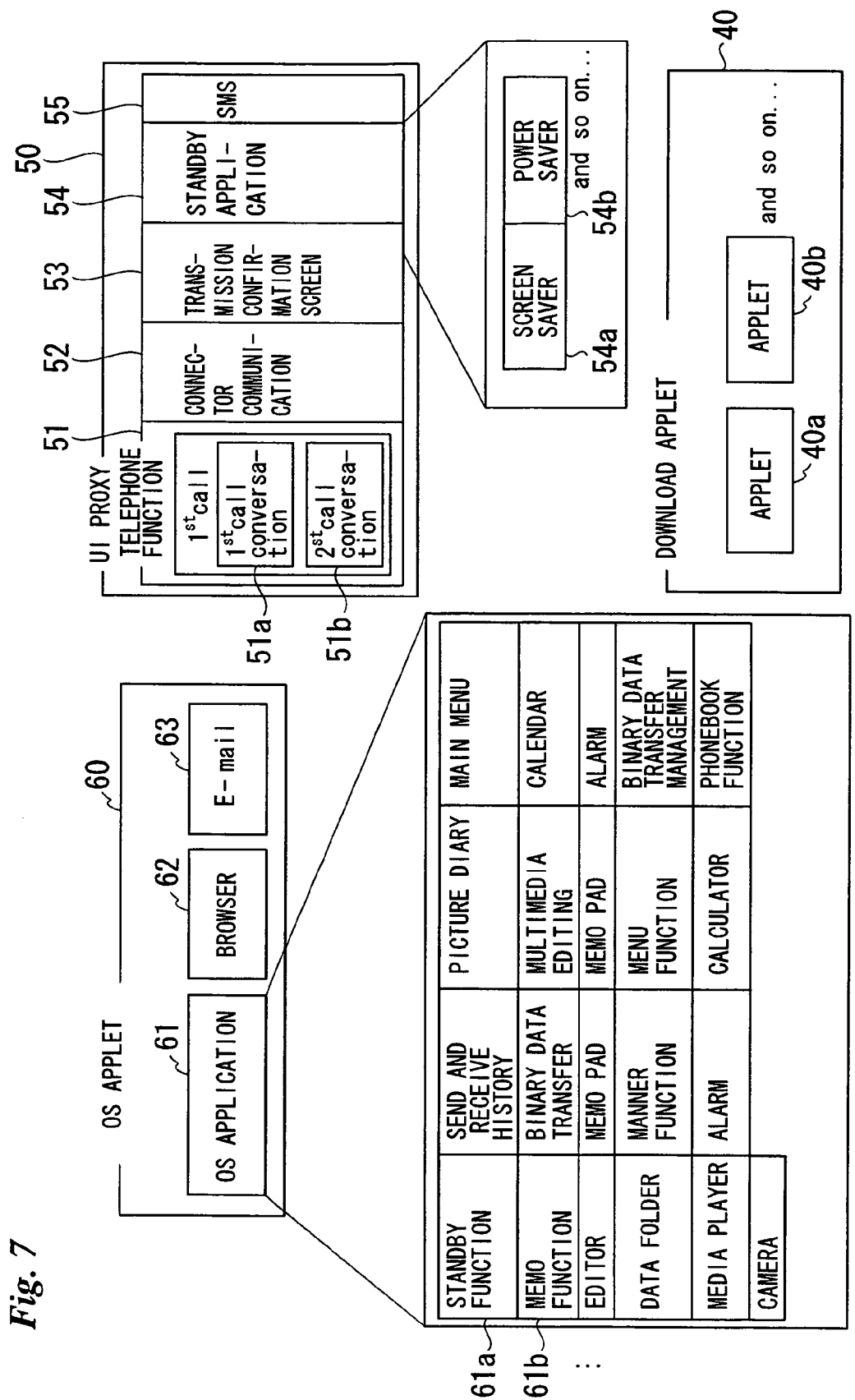
FIG. 7 is a block diagram showing the configuration of the application programs according to the same embodiment.

FIG. 7 is a block diagram showing the configuration of the application programs according to this embodiment. In FIG. 7, an OS applet 60 is the application program provided to the OS, and is constructed of an OS application 61 in which generally used applications such as a standby function 61a and an address book 61b are packaged as one in addition to programs such as a browser 62 and an e-mail 63 to be used by the user for the sake of services including the Internet.

A download applet 40 has a plurality of applets 40a, 40b . . . such as the games downloaded via the cell-phone terminal by the user. A UI (User Interface) proxy 50 is a program for exerting control such as screen display for the user relating to activation of various application programs, and has a telephone function 51, a connector communication 52 for data communication, a transmission confirmation screen 53, a standby application 54 and an SMS (Short Message Service) 55.

Hereunder, this embodiment will be described as to the processing and control based on the worker instead of the applet, which is a minimum unit constituting the applet as a subject of the conflict determination and resume control. The applet is not the subject of control because the applet is further constructed of a plurality of workers so that if control is exerted by the applet, the operation of the plurality of workers relating to the applet is also controlled and the control becomes complicated.

In FIG. 7, the workers are the standby function 61a and address book 61b of the OS application 61, for instance. As for the download applet 40, the applets 40a and 40b are the workers. Furthermore, the telephone function 51 of the UI proxy 50 has a first caller 51a and a second caller 51b as the workers, and the standby application 54 has a screen saver 54a and a power saver 54b included therein as the workers.

Figure 8:
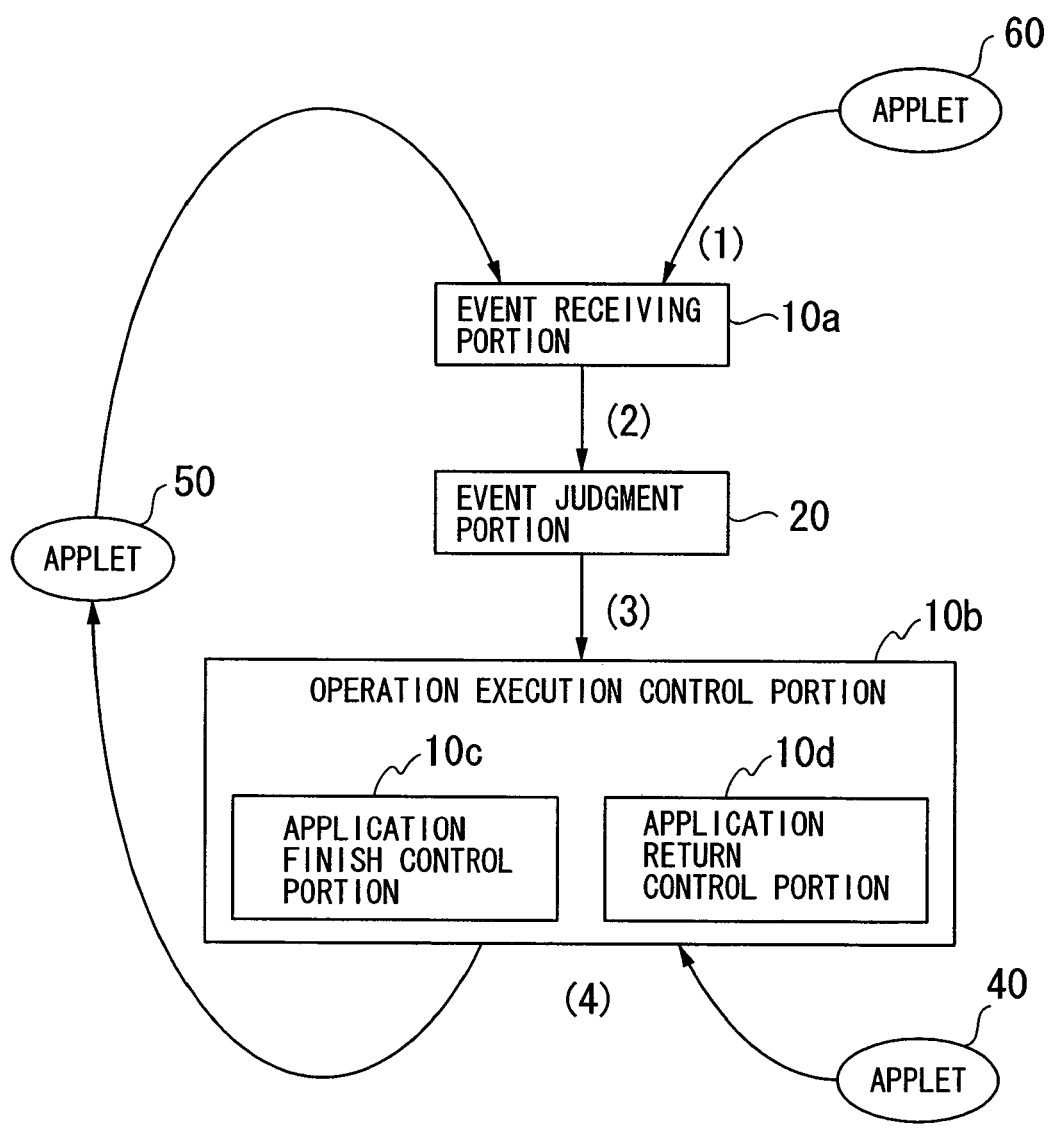
FIG. 8 is a dependency diagram of conflict determination control of the application management portion and an event judgment portion according to the same embodiment.

A description will be given by referring to FIG. 8 to 14 as to the control over the conflict determination in the event judgment portion 20. FIG. 8 is a schematic view showing the relationship between the application management portion 10 and the event judgment portion 20 in conflict determination control.

In FIG. 8, (1) an event receiving portion 10a of the application management portion 10 receives the event from the applet 60 (or applet 50). (2) The event receiving portion 10a determines which worker the request is made to from the information such as a class ID set up in the applet. (3) The event judgment portion 20 performs the conflict determination so as to determine the operation. The conflict determination determines whether or not the worker is in a state capable of activation. If conflicting, it determines to idle or reject an active worker and finish a running worker. (4) An operation execution control portion 10b of the application management portion 10 follows the determined operation and causes an application finish control portion 10c and an application return control portion 10d to perform the process for finish and resume of the worker in addition to the run of the worker in the corresponding applet 60 (or applet 50).

Figure 9:
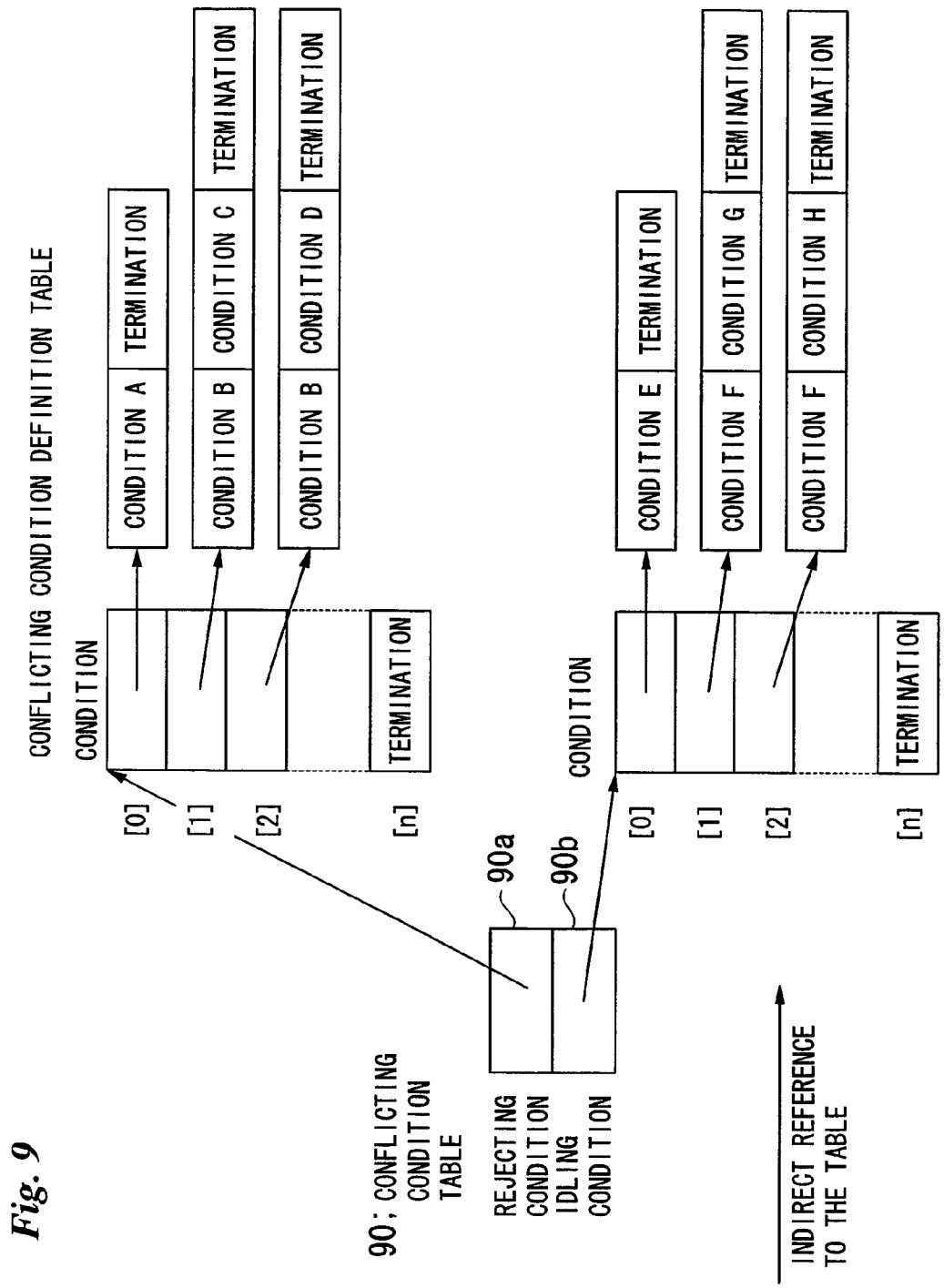
FIG. 9 is a block diagram of a conflicting condition table according to the same embodiment.

FIG. 9 is a diagram showing the configuration of a conflicting condition table 90 preset for each event judgment portion 20 assigned to each worker. As shown in FIG. 9, the conflicting condition table 90 is constructed of a rejecting condition table 90a and an idling condition table 90b, and has a combination of a plurality of conditions set up on each of the rejecting condition table 90a and idling condition table 90b.

When the workers are activated which are accompanied with all the application programs generated inside the cell-phone terminal, all the conditions competing with the workers of the application programs already running and keeping from an immediate activation are specified as the conflicting conditions on either the rejecting condition table 90a or the idling condition table 90b in advance. For instance, as for the worker for activating the schedule alarm, "incoming" is specified as one of the conditions on the idling condition table relating to the worker for activating the schedule alarm so as to be idled during the incoming.

Likewise, as for the worker for activating the auto-power-off, the "incoming" is described as one of the idling conditions of the worker for activating the auto-power-off so as to be idled during the incoming of a call. Furthermore, the rejecting condition table has the conflicting condition of not requiring the activation if an interruption has already occurred to any worker.

In the conflict determination, the rejecting condition table 90a is determined first, and the conflict determination result becomes rejection in the case where it falls under one of the conditions established therein. In the case of falling under none of the rejecting conditions, the idling condition table 90b is determined next so that the conflict determination result becomes idling when meeting one of the conditions established in the idling condition table 90b.

In the case of falling under neither the rejecting condition table 90a nor the idling condition table 90b, the conflict determination result becomes permission. For instance, a preset time comes during the incoming of a call and the event judgment portion is notified of the worker for sounding the schedule alarm, the event judgment portion determines whether or not the conflicting condition "incoming" is specified on the conflicting condition table. In this case, this condition is specified on the idling condition table 90b as described earlier, and so the worker for sounding the schedule alarm suspends the activation without suspending the worker of the incoming. The event judgment portion 20 notifies the operation execution control portion 10b of the determined contents.

Figure 10:
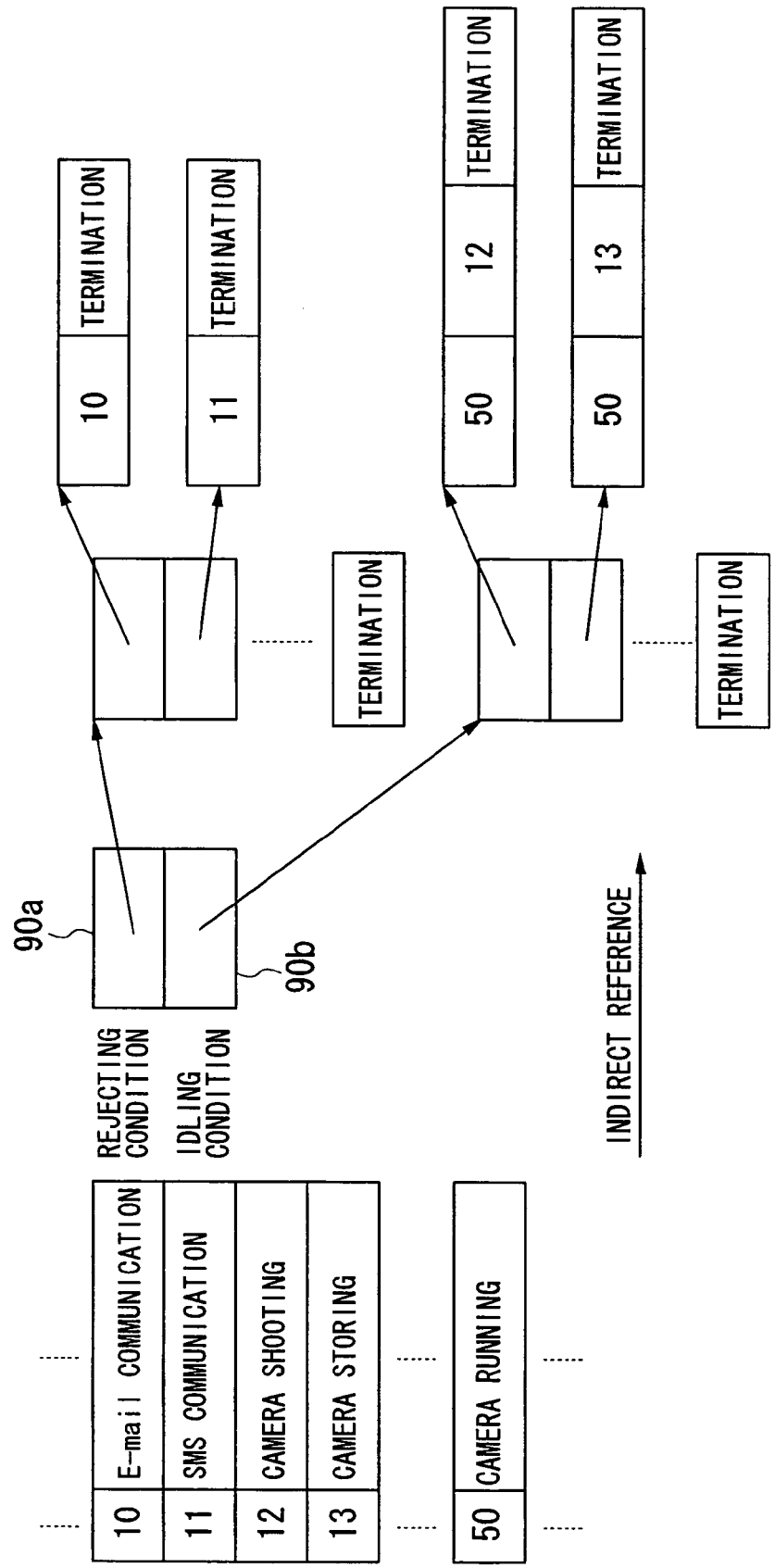
FIG. 10 is a diagram showing a concrete setup form of the conflicting condition table according to the same embodiment.

FIG. 10 is a diagram concretely showing a description of the conditions of FIG. 9. For instance, e-mail communication (condition 10 of FIG. 10) or SMS communication (condition 11) is established as a rejecting condition.

The idling condition table 90b has the conditions of a camera running (condition 50) and a camera shooting (condition 12) and the conditions of the camera running (condition 50) and a camera storing (condition 13) established thereon.

As for the information necessary for the conflict determination of a resource status and other applet statuses for using the camera and so on of the cell-phone terminal established in each condition, the event judgment portion 20 having received the event makes inquiries to the application management portion 10. The application management portion 10 having received the inquiries responds with resource information on the terminal and the information on the statuses of the applications registered by each event judgment portion.

Figure 11:
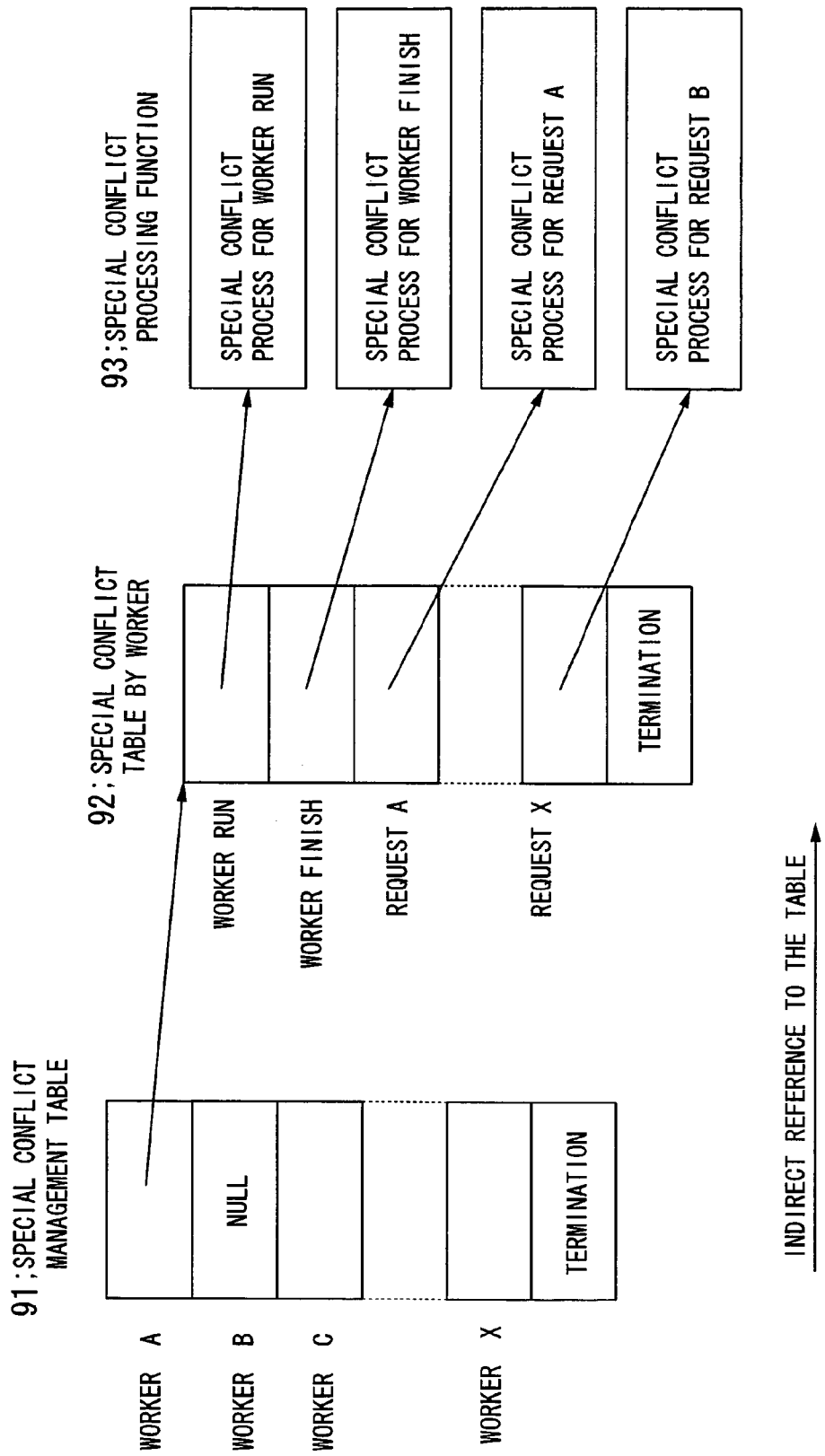
FIG. 11 is a diagram showing meanings of a special measure according to the same embodiment.

FIG. 11 is a diagram for describing means of a special measure in consideration of the events occurring inside the cell-phone terminal due to a common status in a situation of occurrence of various events incapable of controlling the conflict determination in the conflicting condition determination of the event judgment portion 20.

In FIG. 11, a special conflict management table 91 puts together the conflicting conditions in common among a plurality of events, which can be managed more easily when grouped together than when individually established on the conflicting condition tables 90 corresponding to the respective event judgment portions. In the case where a set value is NULL, it means that no operation according to a special conflict determination is set. In the case where it is not NULL, the reference information to a special conflict table by worker 92 is stored.

The special conflict table by worker 92 has the events requiring special conflict processes such as a worker activation and a worker finish set up thereon for instance, and stores the reference information to a special conflict processing function 93 applicable thereto.

The special conflict processes performed by the special conflict processing function 93 are the process for determining the control and other necessary processes. The special conflict processing function 93 is an application interface (API) provided by each worker, where the permission, idling and rejection which are the same return values as the determination results of the event judgment portion 20 are resumed as the determination results so that subsequent processes of worker activation and worker finish are performed as with the process of the conflict determination in the event judgment portion 20.

Here, a remaining battery level will be described as an example of the conflict which is a concrete special case set up on the special conflict management table 91. The cell-phone terminal has a rechargeable battery mounted thereon, and this battery has its remaining battery level managed by a battery voltage management portion not shown. If the remaining battery level becomes less than a first predetermined value, writing to and reading from the memory are apt to become unstable. Therefore, if it becomes less than the first predetermined value, activation is not accepted except for certain limited workers. For instance, it will be in a status in which activation of a camera is not accepted but an incoming notice will be given if there is the incoming of a call. Furthermore, if the remaining battery level becomes low and drops to a second predetermined value lower than the first predetermined value, all the workers are forcedly terminated after a notice of battery depletion is given on the user interface. A special case determination is made by the event judgment portion having accepted an input to the worker corresponding to the event of a low battery level warning from the battery voltage management portion referred to here.

Here, the worker under a specific condition such as the above-mentioned low battery level warning event can be named as the worker which does not become NULL. In the case of the worker corresponding to the event of a low battery level warning based on the first predetermined value, the conditions such as the camera running and schedule alarm are specified in the worker run of the special conflict table by worker, and a function for responding with the permission is described as the special conflict processing function based thereon.

Furthermore, the incoming is described as the worker finish of the special conflict table by worker 92, where a function for resuming the idling is set up as the special conflict processing function 93. In addition, one of the permission, idling and rejection is described. In the case of the low battery level warning based on the second predetermined value, almost all the workers based on the application programs are specified as the worker run and permission (that is, immediate execution in the case of the low battery level warning based on the second predetermined value).

The cases where the low battery level warning based on the second predetermined value occurs as the event are mostly specified as the worker run and permission on the special conflict management table 91. However, "communication" is also specified as conditional permission. To be more specific, if the remaining battery level becomes low and there arises a danger of being unable to maintain the communication, the aforementioned warning is generated as the event so as to finish almost all the workers. As the special case, however, the conditional permission is described in the case of being in communication, where a talk time and the number of acquired packets relating to accounting are calculated before finishing the communication and stored in the memory or sent to a communication network so as to finish the communication thereafter.

As for the worker which becomes NULL, there are the cases of being described based on a general worker rather than the above-mentioned special conflict determination and the cases of being set as NULL on the special conflict management table 91 because of being set up on the individual conflicting condition table 90.

As an example of involving the special conflict determination other than the remaining battery level, there are the cases of activating the e-mail as required during a call in a status of maintaining the call. An "e-mail expansion request" is generated as an event by activating the e-mail, and the event judgment portion having received the event refers to the special conflict management table 91. In this case, only the above-mentioned "low remaining battery level (second predetermined value)" is registered with the event of the "e-mail expansion request" as the special conflicting condition. In the case where the remaining battery level is sufficient, this condition is not applicable, and so the conflict table is referred to next. As the e-mail expansion request is permitted even during the call, the e-mail is expanded and displayed. If the displayed e-mail includes an 11-digit digit sequence beginning with 0 in its text, it is automatically recognized as a telephone number and a display color of the digit sequence is changed.

Continuing the status, if the digit sequence is selected by a cursor operated by the user and a decision key is pressed, a "Phone to" function for calling that number is activated so as to generate the event of a call request. The event judgment portion also has the special conflict management table 91 set up as to this event, where "calling" is described as the rejecting condition as to the event of the call request. In this case, the event of the call request cannot make a new call according to the condition of "communication" so that an error is displayed.

However, in the case where a three-party call agreement is executed with a telecommunication carrier in advance, "permission" is described and so a call can be made. This "permission" specifies a function of the condition of a three-party call so that it is permitted under this condition. In this case, the condition in the case of "calling" on occurrence of the "call request event" of the special conflict management table 91 is rewritten from "rejection" to "conditional permission." This rewriting can be performed either by a loader machine or by radio communication via a base station because the rewriting is easy being put together as the special conflict management table 91.

Furthermore, connection or no connection of an external interface can be named as an event to be set as a special case. The cell-phone terminal normally has a connector of 10 to 18-wires or so, which is used as the external interface on rewriting or reading of an internal memory or connecting a personal computer for the sake of using the cell-phone terminal as a modem. Even if configured to "reject" most operations when using the external interface, the special conflict management table 91 is effective. To be more specific, it is sufficient just to create a table for determining whether or not the external interface is in use, and the process of the conflict determination can be performed without tampering with many other conflicting condition tables 90.

Such conditions of the special cases are very effective means for manufacturers because they are not specifications to be changed along with a model change and points of change can be reduced on design change. To be more specific, the conditions which may occur redundantly to a plurality of events are often specified as to the events having their permission specified on the special conflict management table 91.

Figure 12:
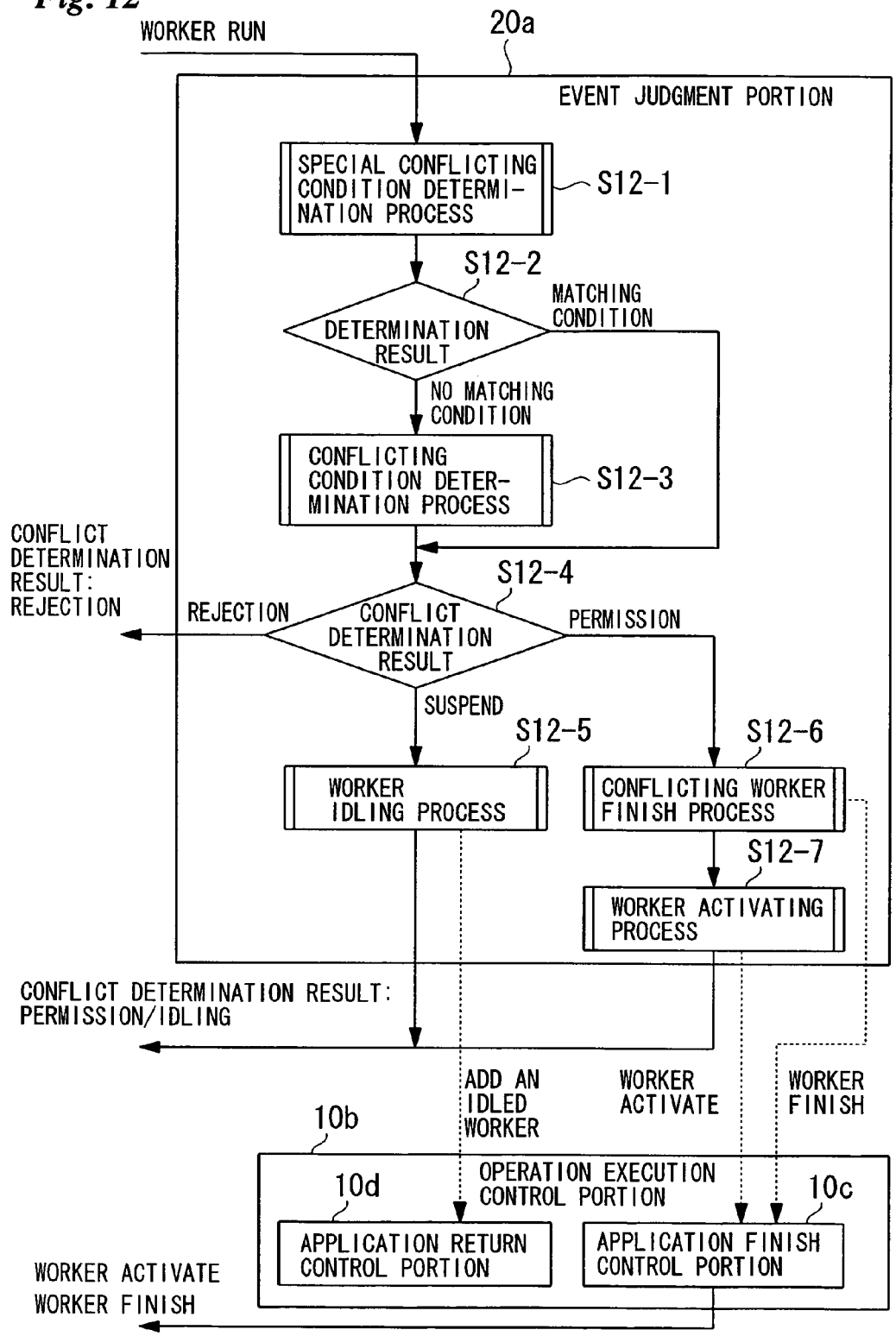
FIG. 12 is a flowchart showing a worker running process of the event judgment portion according to the same embodiment.

FIG. 12 is a flowchart showing a worker running process of the event judgment portion 20.

The event judgment portion 20 performs the determination process according to the above-mentioned conflicting condition tables 90.

The event judgment portion 20a in FIG. 12 is the event judgment portion 20a having received the event of the worker run from the application management portion 10. It is given a different symbol for the sake of distinguishing it from the event judgment portion 20b corresponding to the worker suspended and finished by the competitive status mentioned later.

First, the event of the worker run is received from the event receiving portion 10a of the application management portion 10, and a special conflicting condition determination process is performed according to the above-mentioned special conflict management table 91 (step S12-1). The result of the special conflicting condition determination process is determined (step S12-2), and in the case where there is a matching condition, that is, in the case where there is a conflicting condition, it proceeds to the process of the conflict determination result in a step S12-4. In the case where there is no matching condition, that is, in the case where there is no conflicting condition such as when having NULL specified on the special conflict management table, the conflicting condition determination process is performed according to the conditions established on the conflicting condition tables 90 (step S12-3).

The result of the conflicting condition determination process is determined (step S12-4). In the case of rejection, the rejection of the competing determination result is sent to the application management portion 10. In the case where the determination result is idling, a worker idling process described later is performed and an instruction to add an idled worker is sent to the application return control portion 10d. The application return control portion 10d adds that worker to the return level table 80 (step S12-5).

In the case of permission, it is necessary to finish competing workers in order to activate the worker, and so a competing worker finish control is exerted. In that case, the application finish control portion 10c is given a worker finish instruction to suspend and finish the running workers in conflict (step S12-6). After finishing the running workers, the workers requested to activate are started, and the application finish control portion 10c is given an instruction to activate the workers (step S12-7).

The application finish control portion 10c having activated or finished the workers performs the worker run or worker finish process, and notifies the application management portion 10 of the worker run or worker finish.

In the case where the conflict determination result is the permission or idling, the event judgment portion 20a also sends the information on the permission or idling of the conflict determination result to the application management portion 10. The application management portion 10 having received the rejection, idling, permission, worker run or worker finish instructs the OS to activate and finish the workers so that the running workers are finished and the workers requested to activate are started.

Figure 13:
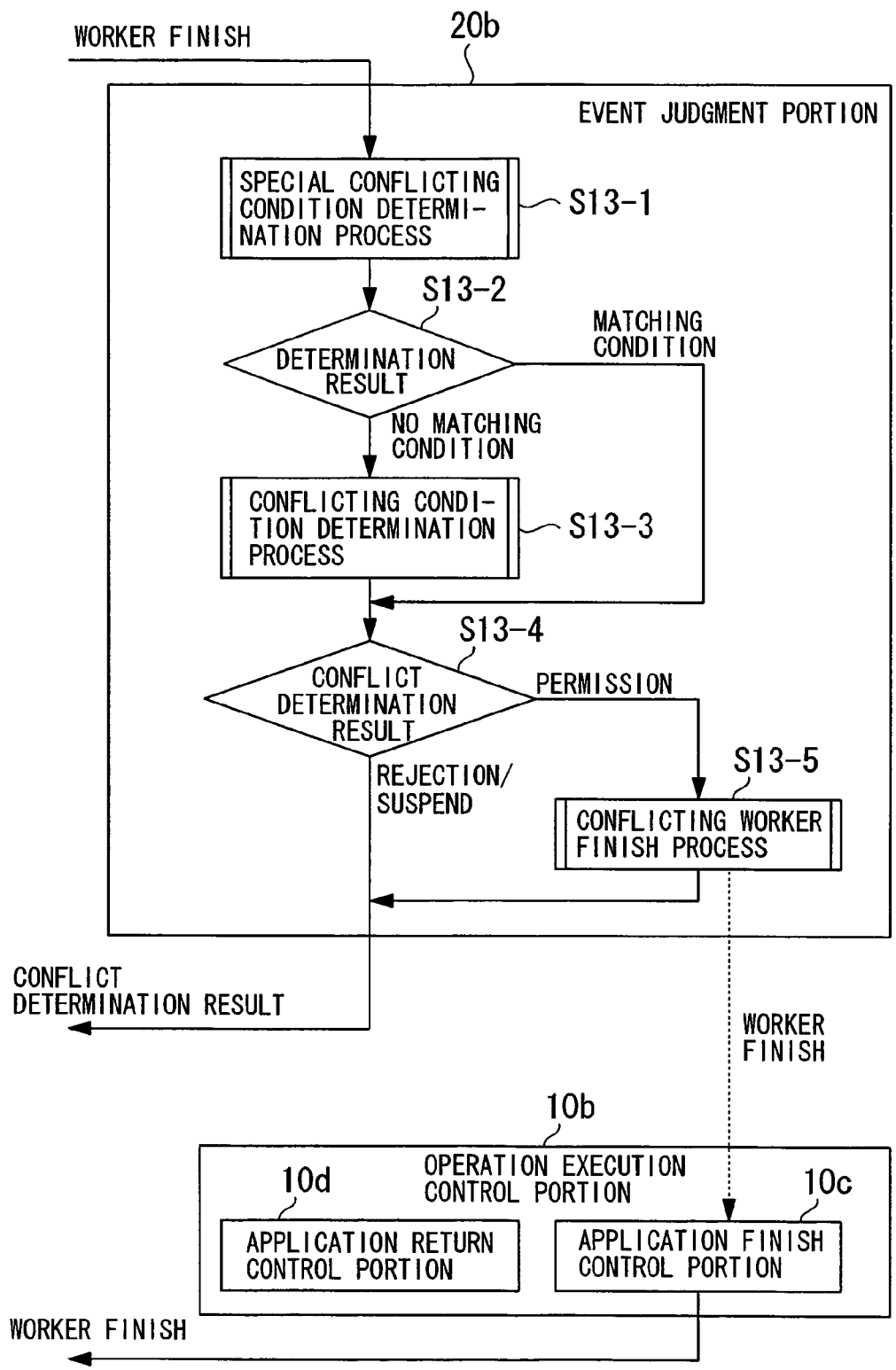
FIG. 13 is a flowchart showing a worker ending process of the event judgment portion due to occurrence of conflict according to the same embodiment.

FIG. 13 is a flowchart showing the process performed by the event judgment portion 20b corresponding to the worker to be suspended and finished due to the conflict in the case where such a worker exists in FIG. 12.

In FIG. 13, the event of the worker finish is the one sent by the application management portion 10 based on the request to finish the running workers of the event judgment portion 20a of FIG. 12. The event judgment portion 20b having received the event of the worker finish performs the special conflicting condition determination process according to the special conflict management table 91 (step S13-1).

The result of the special conflicting condition determination process is determined (step S13-2), and in the case where there is a matching condition, that is, in the case where there is a conflicting condition, it proceeds to the process of the conflict determination result in a step S13-4. In the case where there is no matching condition, that is, in the case where there is no conflicting condition, the conflicting condition determination process is performed according to the conditions established on the conflicting condition tables 90 (step S13-3).

The result of the conflicting condition determination process is determined (step S13-4). In the case where the conflict determination result is rejection or idling, the result is sent to the application management portion 10. In the case where the result is permission, the worker finish process is performed. In that case, the application finish control portion 10c is given an instruction to finish the worker. The application finish control portion 10c having finished the worker sends the worker finish to the application management portion 10 (step S13-5). The application finish control portion 10c having received the worker finish performs the worker finish process and notifies the application management portion 10 of the worker finish. The application management portion 10 instructs the OS to finish the worker.

Figure 14:
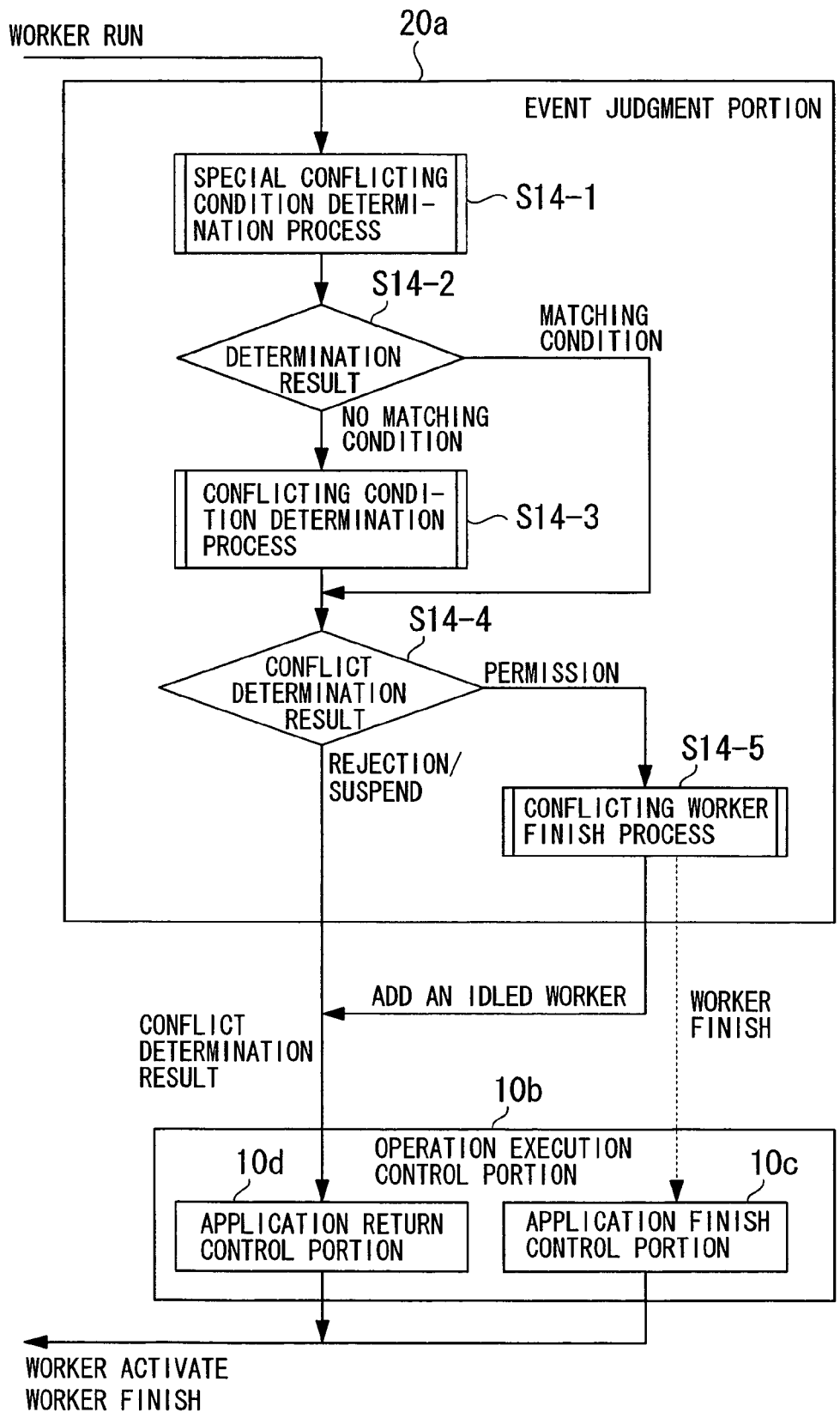
FIG. 14 is a flowchart showing an idled worker returning process of the event judgment portion according to the same embodiment.

FIG. 14 is a flowchart of the process in the event judgment portion 20a in the case of resuming the worker idled as a result of the conflict determination and the worker suspended and finished while running in the process of FIG. 12.

If the running worker is not forcedly but normally terminated, the application management portion 10 having received that effect reads the worker to be resumed from the return level table 80 and sends the worker run to the event judgment portion 20c of that worker.

The event judgment portion 20a having received the event of the worker run first performs the special conflicting condition determination process according to the special conflict management table 91 (step S14-1). The result of the special conflicting condition determination process is determined (step S14-2), and in the case where there is a matching condition, that is, in the case where there is a conflicting condition, it proceeds to the process of the conflict determination result in the step S13-4. In the case where there is no matching condition, that is, in the case where there is no conflicting condition, the conflicting condition determination process is performed according to the conditions established on the conflicting condition tables 90 (step S14-3).

Then the result of the conflicting condition determination process is determined (step S14-4). In the case where the determination result is permission, the process of competing worker finish control is performed and the application finish control portion 10c is given a finish instruction in order to finish the competing worker. The result of the permission is sent to the application return control portion 10d (step S14-5).

In the case where the determination result is rejection or idling, the result is sent to the application return control portion 10d. The application return control portion 10d having received the rejection deletes the applicable worker from the return level table 80. In the case of receiving the idling, it is registered with the return level table 80 again. In the case of receiving the permission, the worker stored on the return level table 80 is read, and the worker run including the reference information to the worker is sent to the application management portion 10. The application finish control portion 10c having received the instruction to finish the competing worker performs the worker finish process and sends the worker finish to the application management portion 10.

The processes of the worker run and finish performed by the above-mentioned application finish control portion 10c will be described by referring to FIG. 15 to 19. Based on these, the event judgment portion handles both the parent workers and child workers in the cases of writing to, reading, deleting and forcedly finishing the return level table.

Figure 15:
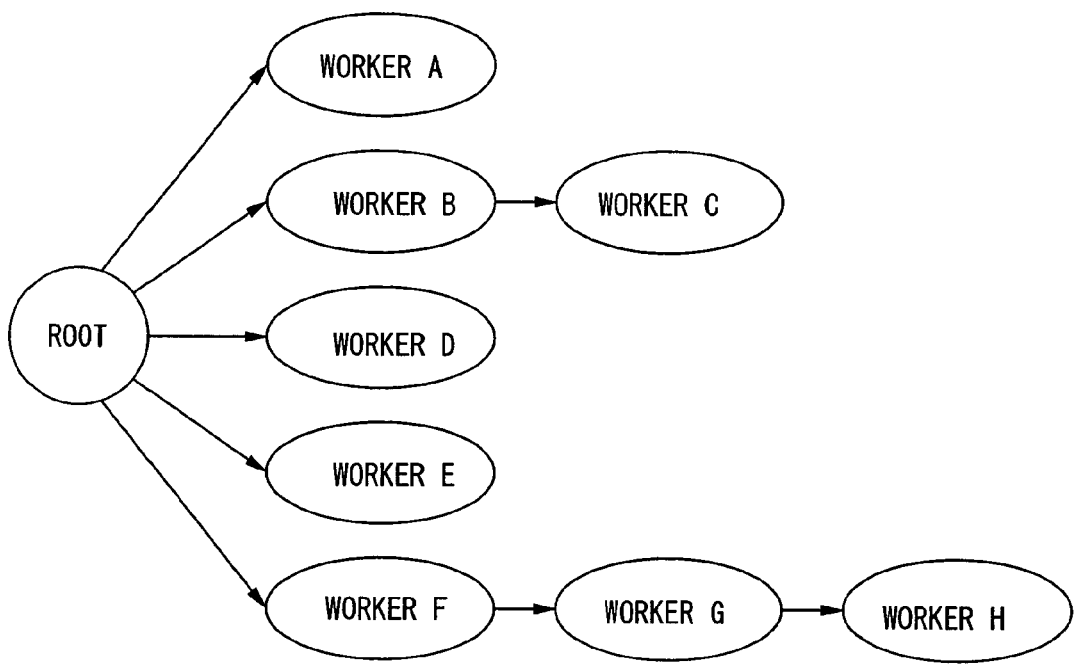
FIG. 15 is a diagram showing the child chain table storing parent-child relations among workers according to the same embodiment.

FIG. 15 is a diagram showing the child chain table 81 storing the parent-child relations among workers. It is a table for controlling a chained finish process such as finishing one worker and then finishing its subordinate workers.

FIG. 15 shows that the parent-child relation is generated by linking the workers which are activated from a reference route. As to whether the worker to be activated should be a child, determinations should be made regarding whether or not an operational result of the worker is expected, whether the worker should be finished together with the parent worker itself or whether the worker is quoted and activated from another worker based on the specification of the cell-phone terminal.

Figure 16:
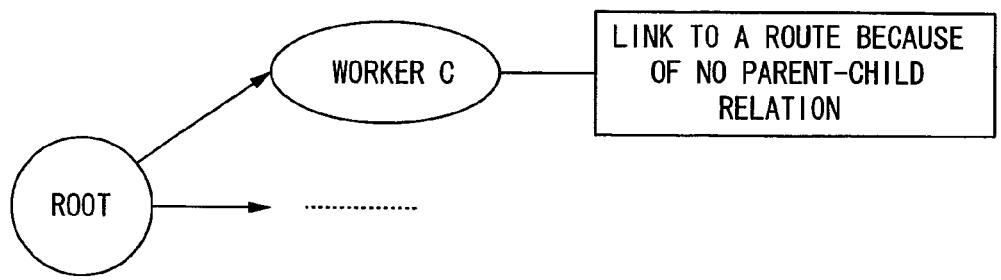
FIG. 16 is a diagram showing the case of dependency between the workers with no parent-child relationship according to the same embodiment.

FIG. 16 is a diagram showing the case of dependency between the workers with no parent-child relation, where a worker C is directly linked from the route.

Figure 17:
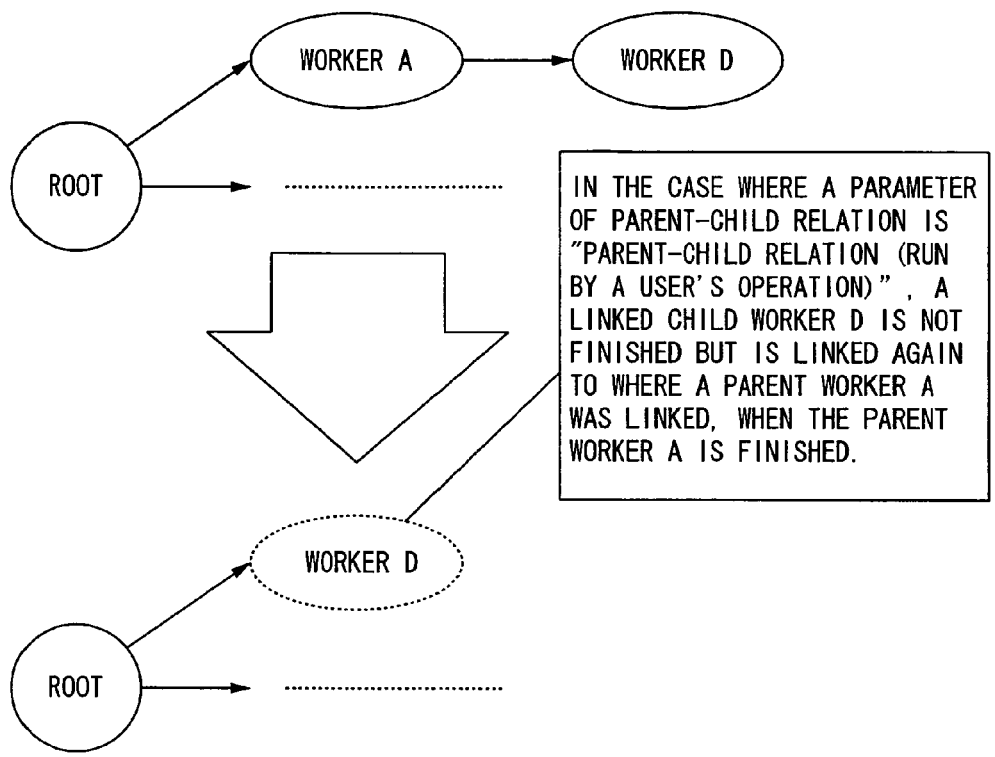
FIG. 17 is a diagram showing the case of dependency between the workers with the parent-child relation according to the same embodiment.

FIG. 17 is a diagram showing the case of the dependency between the workers with the parent-child relation, where a worker A and a worker D are in the parent-child relation. In the case where the worker D is activated by the user's operation, even when the worker A finishes, the linked worker D does not finish but links to a place to which the parent linked, that is, the route. In the case where the worker D is quoted from the worker A and activated, the worker D finishes when the worker A finishes.

Figure 18:
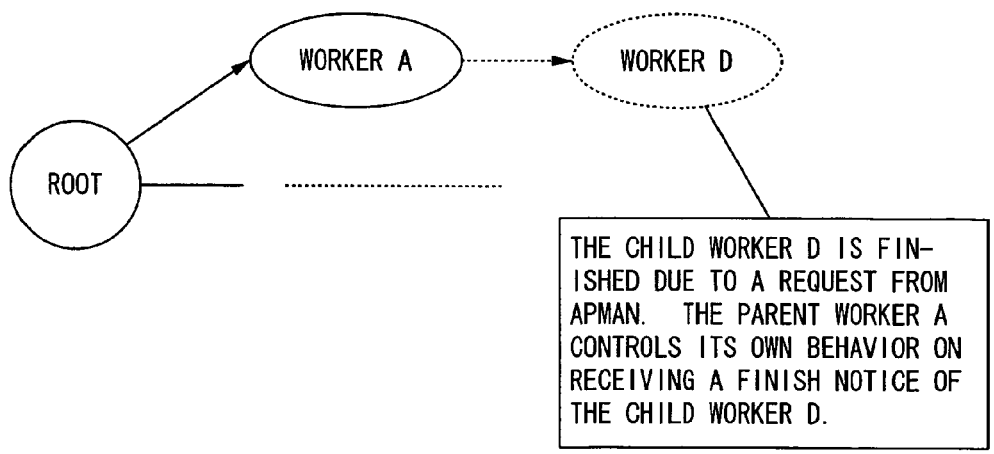
FIG. 18 is a diagram showing the process when finishing a child according to the same embodiment.

FIG. 18 is a diagram showing the process in the case where the child worker D finishes. If the child worker D finishes due to a request from the application management portion 10, the child worker D sends a notice of termination to the parent worker A. The parent worker A having received the notice of termination performs a process such as deleting the information on the child worker D.

Figure 19:
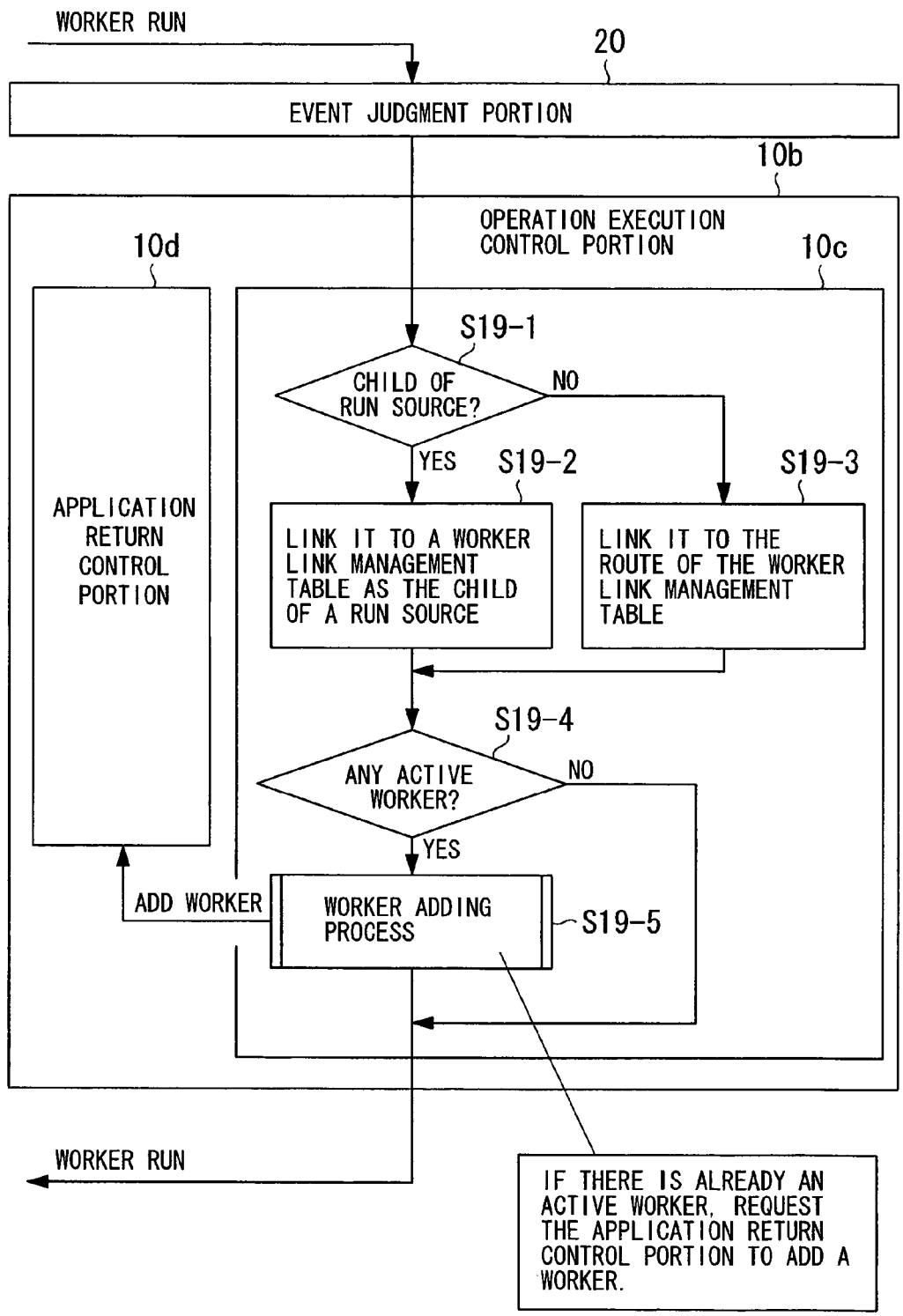
FIG. 19 is a flowchart showing the process of an application finish control portion according to the same embodiment.

FIG. 19 is a flowchart showing the process of the application finish control portion 10c.

The worker run is received from the event judgment portion 20, and it is determined whether or not it is the child of the worker having requested the activation (step S19-1). In the case of the child of the worker having requested the activation, it is linked to a child chain table 80d as the child of the worker having requested the activation (step S119-2). In the case where it is not the child of activation source, it is linked to the route on the child chain table 81 (step S19-3).

Next, it is determined whether or not there is an active worker (step S19-4). In the case where there is the active worker, a worker adding instruction is sent to the application return control portion 10d and the active worker is stored on the return level table 80 so as to send the worker run to the application management portion 10. In the case where there is no active worker, the worker run is also sent to the application management portion 10. In this process, the worker idled while running by conflict is stored on the return level table.

In the case where the worker finish is received, the worker finish is sent to the application management portion 10 after deleting the worker requested to finish from the child chain table 81.

Next, the means for adding the worker to the return level table 80 taken up in FIG. 6 will be described by referring to FIG. 20 to 25.

As for the cases of adding the worker to the return level table 80, there are the cases where the active worker is put in an idled state or the cases where the active worker is suspended due to the conflict determination.

As for the control over the return level table, there are the control for adding the worker to the return level table 80, the control for linking the idled worker in the parent-child relation of which run is suspended, and the like.

Figure 20:
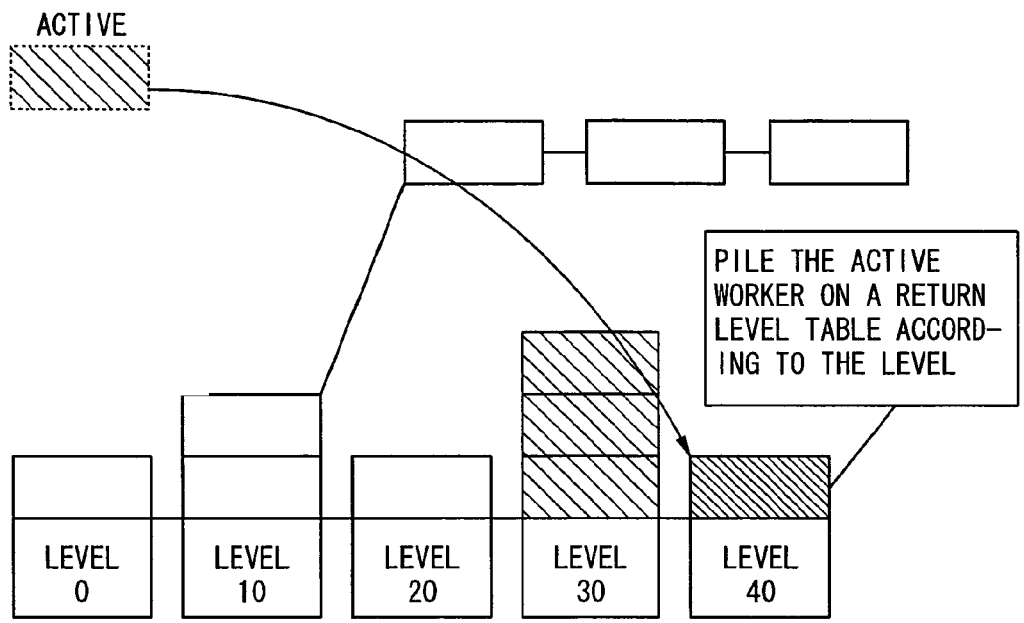
FIG. 20 is a diagram showing the process of adding a worker to the return level table according to the same embodiment.

The process of adding the worker to the return level table shown in FIG. 20 occurs in the cases where the active worker is a worker which is the standby application which is activated by the user's operation and in the cases where it is an interrupting worker such as a telephone function application or an alarm. To be more specific, in the case of the workers having no parent-child relation and directly linking to the route, they are directly piled on the return level table.

Figure 21:
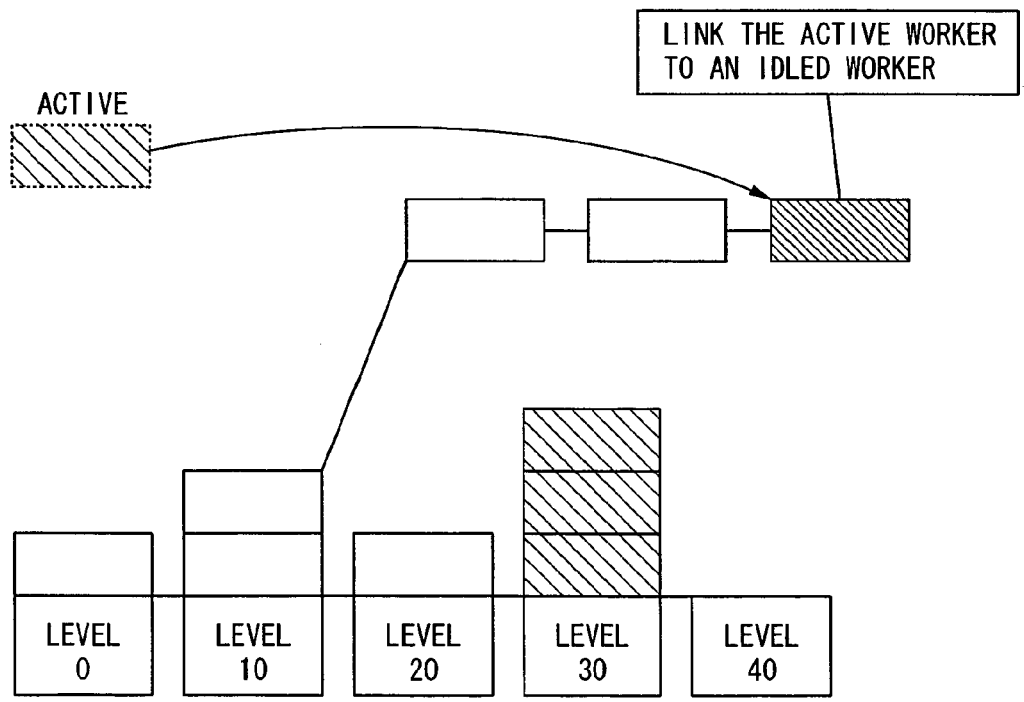
FIG. 21 is a diagram showing the process of linking an active worker to an idled worker according to the same embodiment.

The process of linking the active worker to the idled worker shown in FIG. 21 occurs in the cases where the active worker is a worker which is activated by the user's operation from a worker other than the standby application. This occurs in the cases where the child worker is active and the parent worker is idled as to the workers in the above-mentioned parent-child relation.

Figure 22:
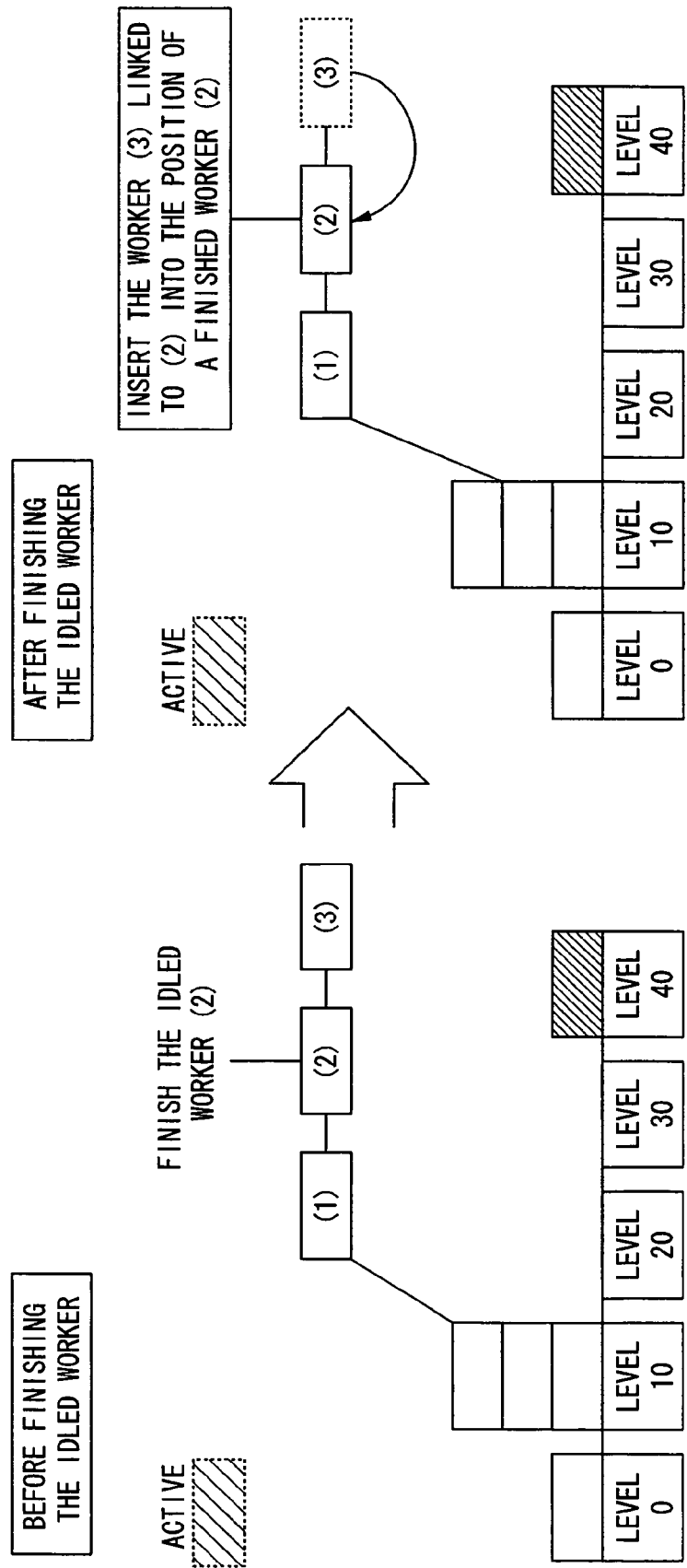
FIG. 22 is a diagram showing the process in the case of finishing a worker linked from the other worker according to the same embodiment.

FIG. 22 is a diagram showing the process in the case of finishing the worker linked from the other worker. In FIG. 22, when an idled worker (2) finishes, a child worker (3) of the finished worker (2) links to (1). For instance, the worker relating to the camera is considered to show its use. In this case, the parent is a "camera running" worker. Furthermore, the child workers are a "self timer" and a "zoom-up." If replaced in FIG. 22, (1) is the camera running, (2) is the self timer, and (3) is the zoom-up. Depending on the specification, if a wake-up alarm running worker further enters in the status of running these (1) to (3) for instance, the event judgment portion is requested to idle the camera-related workers by an application return management portion at an operation effect control portion.

As shown in the left part of FIG. 22, the event judgment portion in charge has these (1) to (3) piled up on the return level table with the parent-child relation associated therewith as-is. When the wake-up alarm process is completed, there are the cases where, as to the self timer of (2) in particular, time count becomes slow and it becomes unusable as the self timer. In such cases, the self timer is removed and the zoom-up of (3) is brought forward to be piled again as (2) as in the right part of FIG. 22 so as to resume the camera-related applications according to the return level table after thus piling it again.

Figure 23:
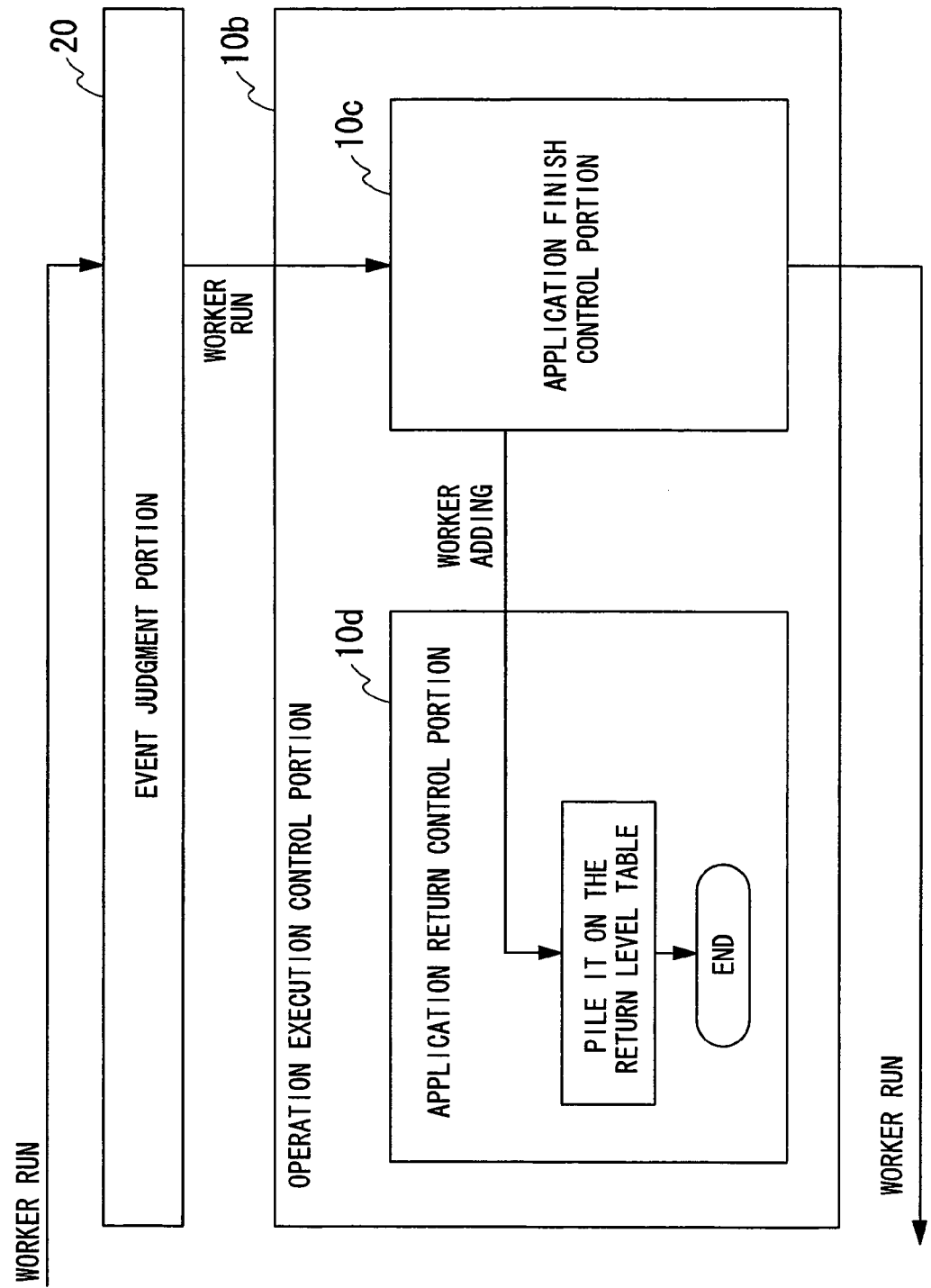
FIG. 23 is a flowchart (1) showing the process of an application return control portion according to the same embodiment.

FIG. 23 is a flowchart showing internal processing of the application return control portion 10d in the case of receiving the worker run. FIG. 23 shows the case where the application finish control portion 10c receives an instruction to activate a worker from the event judgment portion 20 and already has an active worker, it sends the worker adding instruction to the application return control portion 10d in order to idle the active worker. The application return control portion 10d having received the worker adding instruction adds to the return level table the information for resuming the worker included in the worker adding instruction by conforming it to a set level so as to finish the process.

Figure 24:
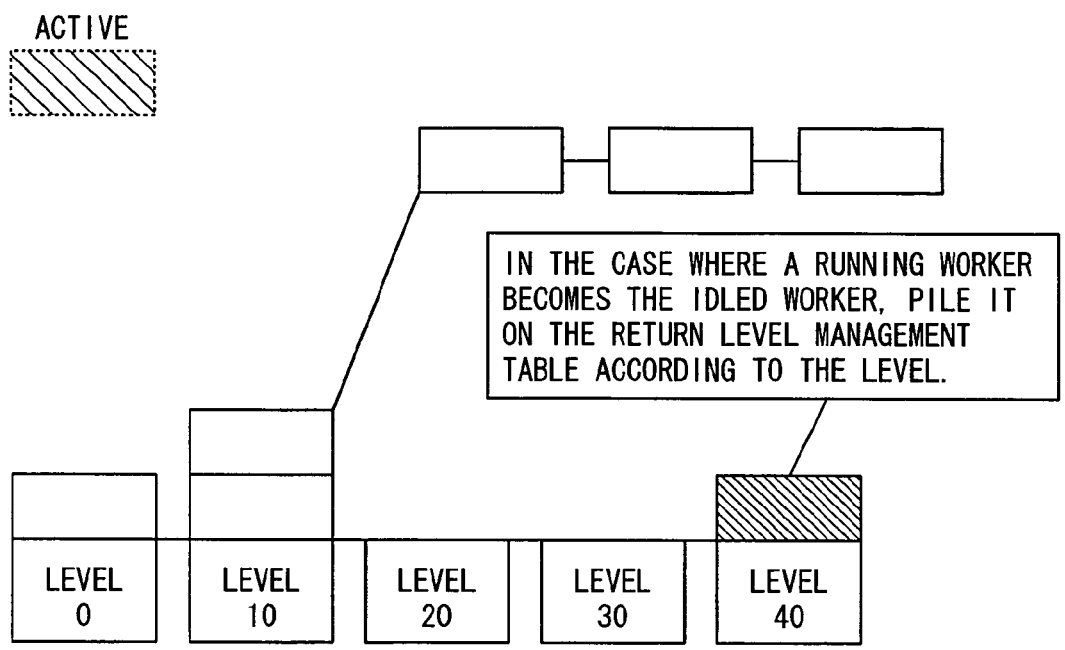
FIG. 24 is a diagram showing the case where a running worker has become an idled worker due to a result of conflict determination according to the same embodiment.

FIG. 24 is a diagram showing the case where the running worker has become the idled worker due to the result of conflict determination, where a newly generated idled worker is added to the return level table by conforming it to the set level.

Figure 25:
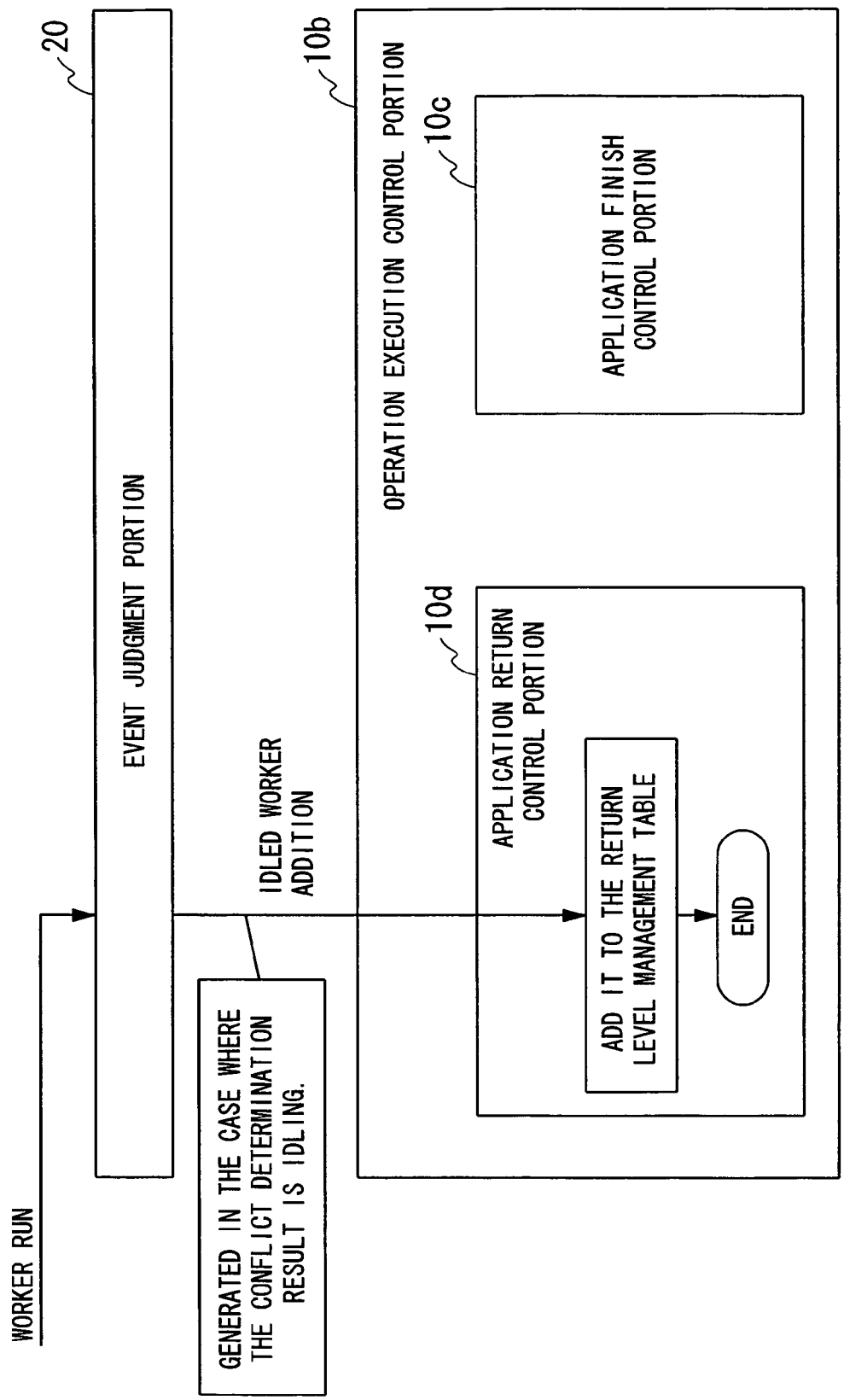
FIG. 25 is a flowchart (2) showing the process of the application return control portion according to the same embodiment.

FIG. 25 is a flowchart showing the internal processing of the application return control portion 10d in the case of FIG. 24.

In the case where the result of conflict determination is the idling, the event judgment portion 20 sends an idle worker adding instruction to the application return control portion 10d. The application return control portion 10d having received the idle worker adding instruction adds the worker to the return level table by conforming it to the information for resuming and the level included in the idle worker adding instruction so as to finish the process.

As described above, the application management portion 10 provides a construction to process division of the events, process activation, finish, idle and resume of the applications 30, and perform the conflict determination by closing it in application 30 corresponding to each event judgment portion 20. For this reason, the process of the conflict determination does not center on one portion but is dispersed. Even if the application 30 is added, it is possible to newly add the event judgment portion 20 so that no significant change is made to the OS, the application management portion 10, and the like.

The application management portion 10 exerts control to run only one application 30 on the cell-phone terminal. For that reason, there is only one application program running on the OS, and so it is no longer necessary to use the stack storage area of the OS library 1 incapable of the complicated resuming process such as the priority processing. It is thereby possible to control the conflict determination of the application program only with the application management portion 10. It is thus possible, when adding a function, to do so by closing it off on the application side without necessity to change the OS.

Furthermore, the return level table 80 stores the return information on the application programs idled, suspended or finished according to the return levels preset to the applications. When the running program is finished, the programs are resumed in lowering order of the return level and based on the return information most newly stored.

For that reason, even in the case where two events are idled as notified of the event of the schedule alarm and further notified of the event of the auto-power-off during the incoming, it will no longer happen that, after finishing the incoming, the auto-power-off resumes first leaving the schedule alarm so as to turn off the power, if the return level of the auto-power-off is set lower than that of the schedule alarm. Furthermore, it is possible, by rendering the return level arbitrarily settable, to control the returns of the application programs on the cell-phone terminal in arbitrary order. It is thereby possible, even if the programs are idled in order of interruption handling such as the incoming, arrival of the e-mail and alarm, to exert control such as resuming the alarm first and then processing the incoming e-mail.

The above-mentioned cell-phone terminal has a computer system inside. The above-mentioned processes of cell-phone terminal are stored on a computer-readable recording medium in the form of the program so that the processes are performed by having this program read by the computer. Here, the computer-readable recording medium means a magnetic disk, a magnetooptical disc, a CD-ROM, a DVD-ROM, a semiconductor memory, or the like. It is also feasible to deliver this program to the computer via a communication line so as to have the program executed by the computer having received it.

According to the cell-phone terminal, program management method and computer program thereof of the present invention, it is possible to arbitrarily control the resumes of the application programs on the cell-phone terminal. It is thereby possible, even if the programs are idled in order of the interruption handling such as the incoming, arrival of the e-mail and alarm, to exert control such as resuming the alarm first and then processing the incoming e-mail.

What is claimed is:

1. A cell-phone terminal which manages an operation of a plurality of computer programs by receiving an event information, detecting a computer program for application corresponding to the event information out of the plurality of computer programs and notifying the detected computer program of reception of the event, comprising:
   a return information storing means for storing return information which is necessary to resume a computer program which had executed in advance; and
   a computer program returning means for activating computer programs, wherein
   a conflicting condition and a return priority being preset to each of the plurality of computer programs in advance,
   when the event information indicating an activation of another computer program while a computer program is being executed and said another computer program is activated after suspending the computer program based on the conflicting condition of the other computer program, the return information storing means stores the return information necessary for resuming of the computer program according to the return priority, and
   the computer program returning means, each time the executing program is finished, reads the return information stored by the return information storing means in descending order of the return priority and activating a program corresponding to the read return information.

2. The cell-phone terminal according to claim 1, wherein the return information storing means stores the return information which is necessary to resume another computer program, as to each of the return priorities, under conditions of
executing a computer program in advance,
receiving the event information which requests to execute the another computer program, and
not activating the another computer program which is requested to execute, but executing the computer program continuously, referring to the conflicting condition of the another computer program.

3. The cell-phone terminal according to claim 1, wherein the computer program returning means, on reading the return information in decreasing order of the return priority which is stored by the return information storing means, reads the return information most newly recorded in a case in which the return priority is duplicated after end of execution of a computer program.

4. The cell-phone terminal according to claim 1, wherein setting of the return priority is changeable by a user's operation.

5. The cell-phone terminal according to claim 1, wherein the return priority does not allow a computer program to resume when a predetermined value is set.

6. A computer program management method in order to manage an operation of a plurality of computer programs by receiving an event information, detecting a computer program for application corresponding to the event information out of the plurality of computer programs and notifying the detected computer program of reception of the event, comprising steps of:
   first step of receiving the event information which requests for activation of another computer program while a computer program is executing in advance;
   second step of storing a return information which is necessary to resume the computer program executing in advance, as to each return priority being predetermined to each of the plurality of computer programs in advance, in case of referring to a conflicting condition of the another computer program which is requested to execute and executing that computer program by suspending the computer program based on the conflicting condition; and
   third step of reading the return information which is stored in the second step, in decreasing order of the return priority, and activating a corresponding computer program corresponding to the read return information, each time the executing computer program is finished.

7. A computer program product stored in a computer readable medium for use in a cell-phone terminal which manages an operation of a plurality of computer programs by receiving an event information, detecting another computer program for application corresponding to the event information out of the plurality of computer programs and notifying the another computer program of reception of the event, the computer program product comprising:
   first instructions for applying a return information storing means to store a return information which is necessary to resume a computer program that is executing in advance, as to each return priority predetermined to each of the plurality of computer programs, under a condition of receiving the event information which requests for activation of the another computer program in a situation of having the executing computer program in advance, referring to a conflicting condition of the another computer program and activating the another computer program after suspending the executing computer program based on the conflicting condition; and
   second instructions for applying a computer program returning means, each time the executing computer program is finished, to read the return information stored by the return information storing means in decreasing order of the return priority and activating a computer program corresponding to the read return information.

8. A cell-phone terminal having a plurality of computer programs of applications and resources of devices used by the applications, comprising:
a computer program management means for detecting a computer program corresponding to an event information which is received, out of the plurality of computer programs in the case of receiving the event information, checking a status of computer programs other than the detected computer program and resources and responding with a check result in case of receiving a status check request, and not activating the detected computer program in case of receiving a notice not to activate the detected computer program, and storing a return information for resuming the detected computer program in a predetermined storage area and reading the return information and activating the detected computer program when an executing computer program finishes;
a conflicting condition storing portion for storing conflicting conditions in which conditions are set for not allowing activation according to the status of other computer programs or the resources as to each of the plurality of computer programs; and
an event judgment means for, if the computer program management means receives the event information, reading the conflicting condition corresponding to the computer program detected by the computer program management means from the conflicting condition storing portion and sending the status check request to the computer program management means, making a reference, on receiving the check result from the computer program management means, as to whether the check result matches with the status established in the read conflicting condition so as to activate the computer program detected by the computer program management means in the case of matching with none of the conflicting conditions and notify the computer program management means that the computer program is not to be activated in the case of matching with one of the conflicting conditions.

9. The cell-phone terminal according to claim 8, wherein the event judgment means, on activating the computer program detected by the computer program management means, sends a notice of activation to the computer program management means,
on receiving the notice, the computer program management means checks an operational status of the computer programs other than the computer program to be activated, and if there is an executing computer program, the computer program management means suspends the executing computer program and stores the return information of the executing computer program in the predetermined storage area for resuming the executing computer program later.

10. The cell-phone terminal according to claim 8, wherein a computer program is associated with a preset and predetermined conflicting condition in the case where the computer program is created by a third party and received via network.

11. The cell-phone terminal according to claim 8, wherein the conflicting condition storing portion stores special conflicting conditions in common among a plurality of pieces of the event information, and
after receiving the event information, the event judgment means reads the special conflicting conditions, determines whether or not the check result matches with the special conflicting conditions and in addition, in the case of not matching with the special conflicting conditions, determines whether or not the check result matches with the conflicting conditions.

12. A computer program management method of a cell-phone terminal which has
a computer program management portion for storing a plurality of computer programs of applications and having resources of devices used by the applications and managing operations of the computer programs,
an event judgment portion for determining a conflicting status of the computer programs, and
a conflicting condition storing portion for storing conflicting conditions in which conditions are set for not allowing execution of each of computer programs according to status of other computer programs and the resources in advance, comprising steps of:
detecting the computer program corresponding to a received event information out of the plurality of computer programs by the computer program management portion in case of receiving the event information;
reading the conflicting condition corresponding to the computer program detected by the computer program management portion from the conflicting condition storing portion and sending a status check request to the computer program management portion, by the event judgment portion, when the computer program management portion receives the event information;
checking status of the computer programs other than the detected computer program and the resources and responding with a check result in case of receiving the status check request, by the computer program management portion;
making a reference as to whether the check result matches with the status established in the read conflicting condition when the check result from the computer program management portion is received, activating the computer program detected by the computer program management portion in case of matching with none of the conflicting conditions, and notifying the computer program management means that the computer program is not to be activated in the case of matching with one of the conflicting conditions, by the event judgment portion; and
when being notified that the detected computer program is not to be activated, storing a return information for resuming the detected computer program in a predetermined storage area without activating the detected computer program, and reading the return information and activating the detected computer program on finishing a computer program which is executing, by the computer program management portion.

13. A computer program product stored in a computer readable medium of a computer of a cell-phone terminal having
a computer program management portion for storing a plurality of computer programs of applications and having resources of devices used by the applications and managing operation of the computer programs,
an event judgment portion for determining a conflicting status of the computer programs, and
a conflicting condition storing portion for storing conflicting conditions in which conditions are set for not allowing activation of each of the computer programs according to the status of the other computer programs and the resources in advance, the computer program product comprising:

computer program code for performing so as to make the computer program management portion detect the computer program corresponding to the received event information out of the plurality of computer programs in case where the computer program management portion receives event information;

computer program code for performing so as to make the event judgment portion read the conflicting conditions corresponding to the computer program detected by the computer program management portion from the conflicting condition storing portion and send the status check request to the computer program management portion in case where the computer program management portion receives the event information;

computer program code for performing so as to make the computer program management portion check a status of the computer programs other than the detected computer program and the resources and responding with a check result in case of receiving the status check request;

computer program code for performing so as to make the event judgment portion on receiving the check result from the computer program management portion, make a reference as to whether the check result matches with the status established in the read conflicting condition so as to activate the computer program detected by the computer program management portion in case of matching with none of the conflicting conditions and notify the computer program management portion that the computer program is not to be activated in case of matching with one of the conflicting conditions; and computer program code for performing so as to make the computer program management portion, if notified that the detected computer program is not to be activated, store return information for resuming the detected computer program in a predetermined storage area without activating the detected computer program, and read the return information and activate the detected computer program on finishing the executing computer program.

14. A cell-phone terminal for receiving event information, detecting a computer program of an application corresponding to the event information out of a plurality of computer programs and notifying the computer program of the event information so as to manage an operation of the computer program, comprising;

an operational status storing portion for storing operational statuses of the plurality of computer programs;

a conflicting condition determining means for determining whether or not to activate the computer program based on a preset and predetermined conflicting condition and the event information on detecting the computer program corresponding to the event information; and a computer program management means for, on receiving a determination to newly activate the computer program from the conflicting condition determining means, reading the operational statuses of the computer programs other than the computer program from the operational status storing portion, suspending an executing computer program and activating the program determined to be newly activated so as to update the operational status of the operational status storing portion, wherein the computer program management means stores return information for resuming the computer program in a predetermined storage area upon suspending the executing computer program and activating the computer program upon finishing the executing computer program based on the return information.

* * * * *